US009412138B2

(12) United States Patent
Foslien

(10) Patent No.: US 9,412,138 B2
(45) Date of Patent: Aug. 9, 2016

(54) DASHBOARD FOR MONITORING ENERGY CONSUMPTION AND DEMAND

(75) Inventor: Wendy Foslien, Woodbury, MN (US)

(73) Assignee: Honeywell International Inc., Morris Plains, NJ (US)

( * ) Notice: Subject to any disclaimer, the term of this patent is extended or adjusted under 35 U.S.C. 154(b) by 449 days.

(21) Appl. No.: 13/220,895

(22) Filed: Aug. 30, 2011

(65) Prior Publication Data

US 2013/0055132 A1    Feb. 28, 2013

(51) Int. Cl.
G06F 3/048    (2013.01)
G06Q 50/06    (2012.01)
G06F 17/30    (2006.01)

(52) U.S. Cl.
CPC .......... *G06Q 50/06* (2013.01); *G06F 17/30554* (2013.01); *Y02B 60/188* (2013.01)

(58) Field of Classification Search
None
See application file for complete search history.

(56) References Cited

U.S. PATENT DOCUMENTS

| | | | | |
|---|---|---|---|---|
| 7,920,983 | B1* | 4/2011 | Peleg et al. | 702/100 |
| 2004/0162902 | A1* | 8/2004 | Davis | H02J 13/0075 709/227 |
| 2004/0225648 | A1* | 11/2004 | Ransom et al. | 707/3 |
| 2008/0229226 | A1* | 9/2008 | Rowbottom et al. | 715/771 |
| 2009/0001181 | A1 | 1/2009 | Siddaramanna et al. | |
| 2009/0088907 | A1* | 4/2009 | Lewis et al. | 700/286 |
| 2009/0125825 | A1 | 5/2009 | Rye et al. | |
| 2010/0064001 | A1* | 3/2010 | Daily | 709/203 |
| 2010/0100253 | A1* | 4/2010 | Fausak et al. | 700/295 |
| 2010/0286937 | A1* | 11/2010 | Hedley et al. | 702/60 |
| 2010/0318200 | A1 | 12/2010 | Foslien et al. | |
| 2010/0324962 | A1* | 12/2010 | Nesler et al. | 705/8 |
| 2011/0016017 | A1* | 1/2011 | Carlin et al. | 705/26.4 |
| 2011/0029350 | A1* | 2/2011 | Ronen et al. | 705/9 |
| 2011/0087076 | A1* | 4/2011 | Brynelsen | A61B 5/1118 600/300 |
| 2011/0119042 | A1* | 5/2011 | Johnson et al. | 703/6 |
| 2011/0215945 | A1* | 9/2011 | Peleg et al. | 340/870.02 |
| 2011/0289019 | A1* | 11/2011 | Radloff et al. | 705/412 |
| 2012/0271472 | A1* | 10/2012 | Brunner | G06F 1/3209 700/295 |

OTHER PUBLICATIONS

Energy WorkSite by NorthWrite, Internet Wayback archive, Feb. 19, 2010. 3 pages.*

* cited by examiner

*Primary Examiner* — Hien Duong
(74) *Attorney, Agent, or Firm* — Seager, Tufte & Wickhem LLP

(57) ABSTRACT

A system for presenting a utility consumption dashboard. The dashboard may have one or more panes for displaying energy or other utility consumption related information. A pane may indicate utility consumption and time periods of consumption. Data of utility consumption may be shown in terms of years, quarters or months, for different types of utility consumption such as electrical, gas, and so forth. Utility consumption may be noted in various contexts. Another pane may provide daily patterns related to utility consumption. Still another pane may provide a scatter plot of data points relating to utility consumption and temperature outside of the space. Dynamic interaction, including analysis, may involve utility consumption, time period, and temperature outside the space. A data or information point in any of the panes may be selected to reveal a tool tip that highlights details about the point.

18 Claims, 36 Drawing Sheets

DASHBOARD FOR MONITORING ENERGY CONSUMPTION AND DEMAND

BACKGROUND

The present disclosure pertains to energy and particularly to energy consumption and demand. The disclosure more particularly pertains to monitoring energy consumption and demand.

SUMMARY

The disclosure reveals a system for presenting an energy dashboard. The dashboard may have one or more panes for displaying energy related information. A pane may indicate energy or other resource (e.g., water) use (consumption or demand) and time periods of the resource use. Data of the energy use may be shown in terms of years, quarters or months, for different types of energy use such as electrical, gas, and so forth. The energy use may be noted in a context of a space being occupied or unoccupied. Another pane may provide daily patterns related to the energy use. Still another pane may provide a scatter plot of data points relating to energy use and temperature outside of the space. A dynamic interaction may exist among energy use, time period, and temperature outside the space. A data or information point in any of the panes may be selected to reveal a tool tip that highlights details about the point.

BRIEF DESCRIPTION OF THE DRAWING

FIG. 6 is a diagram of another example using a different occupancy context from a monthly view;

FIGS. 34 and 35 show a tool tip for a gas data point on a particular day in one year, and a tool tip for a gas data point on the same particular day of another year, respectively, for a multiple year comparison.

DESCRIPTION

The present approach may use incremental (e.g., 15 minute) interval meter data in an interactive dashboard to provide context and comparison information. The approach may be used by an energy analyst providing services, or facility manager tracking energy consumption. Examples of where this tool may be used include energy monitoring services for commercial buildings to provide rapid review of large amounts of data. The tool may also be deployed at a user site, so that local employees can use data efficiently to manage resource consumption.

Figure 1:
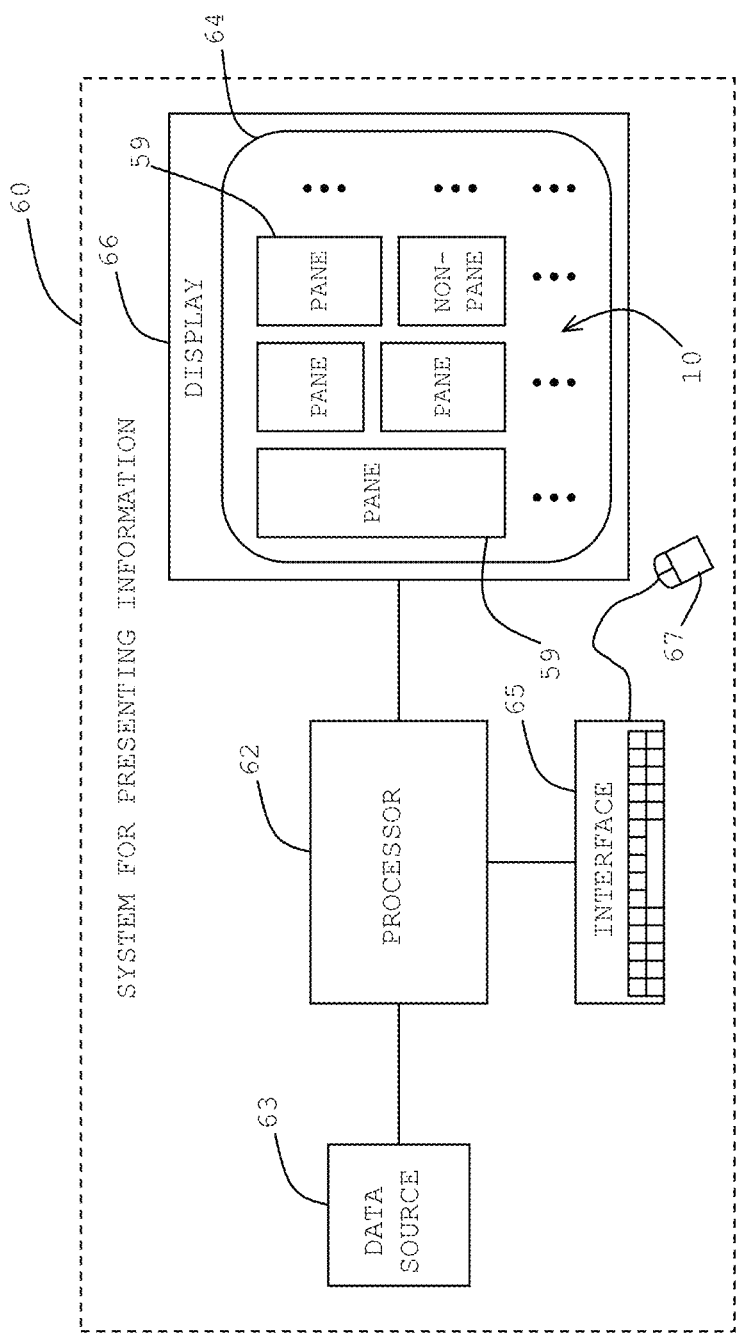
FIG. 1 is a diagram of an illustrative example of a system which may be utilized for displaying the dashboard.

In FIG. 1, a system 60 for presenting information may be utilized for displaying a dashboard 10. A data source 63 may provide information to a processor 62. Data source 63 may receive information from utility meters, sensors, external databases, and so forth. An interface 65 may be connected to processor 62. Interface 65 may be used to seek information via the Internet, cable, wireless media, and other ways of conveyance. The processor may effect software and incoming data to present dashboard 10 on a display 66. Interface 65 may have a keyboard among other things for interaction with processor 62. A mouse 67 may be connected to interface and be used for moving a cursor or other items on a screen or presentation 64 of the dashboard on display 66. Screen or presentation 64 may show dashboard 10 with one or more panes 59 of information. The dashboard and/or the panes 59 may be or incorporate one or more interactive presentations. There may be one or more non-panes as appropriate or needed. Panes and non-panes may be available for other information, making selections, and so on. A "user interface" may incorporate the keyboard, the mouse, the display in situations where it facilitates user interaction, and other items such as a touch screen, joystick and sound, that enable a user to interact and operate within and outside of system 60. System 60, as shown herein, may be just one illustrative example of a mechanism for implementing the present dashboard approach. Other examples for implementing the dashboard approach may incorporate tablets, iPads, PDAs, and so forth.

The approach for presenting a utility consumption dashboard may incorporate generating dashboard 10 on display 66 with processor 62, generating one or more panes 59 on the dashboard, and at least one pane 59 having an interactive view of information related to energy. Interaction with the interactive view of the information related to energy may be effected with a user interface 65, 67, 66. The approach may further incorporate generating a tool tip on a data point in a pane 59 to get detailed information. Other items may be effected with the present approach.

The dashboard may provide an integrated and interactive view of the data. The dashboard may allow users to simultaneously compare the month to month and year over year energy or other resource use for one or more of electrical, gas or water meters at a site.

The monthly energy use may be divided into occupied and unoccupied periods or periods defined by other contexts that affect consumption, and these periods can be highlighted using contrasting shading, symbols or colors. The daily consumption may be shown on a calendar, and this calendar may also highlight the occupied and unoccupied periods using the same shading, symbol or color scheme, as the monthly summary. A third pane may show the energy consumption as a function of a normalizing variable such as temperature, production rates, sales or other contexts that affect consumption. The monthly summary may be used as a filtering tool to select the periods for the calendar and normalizing views. Additional filtering variables may be available, to select the time ranges and the meters. Parametric variables may be available to adjust the occupied period or other contexts that affect consumption.

One approach may be to use static charts, but it may be expanded to parametric settings for an input of occupancy or other context variables.

Figure 2:
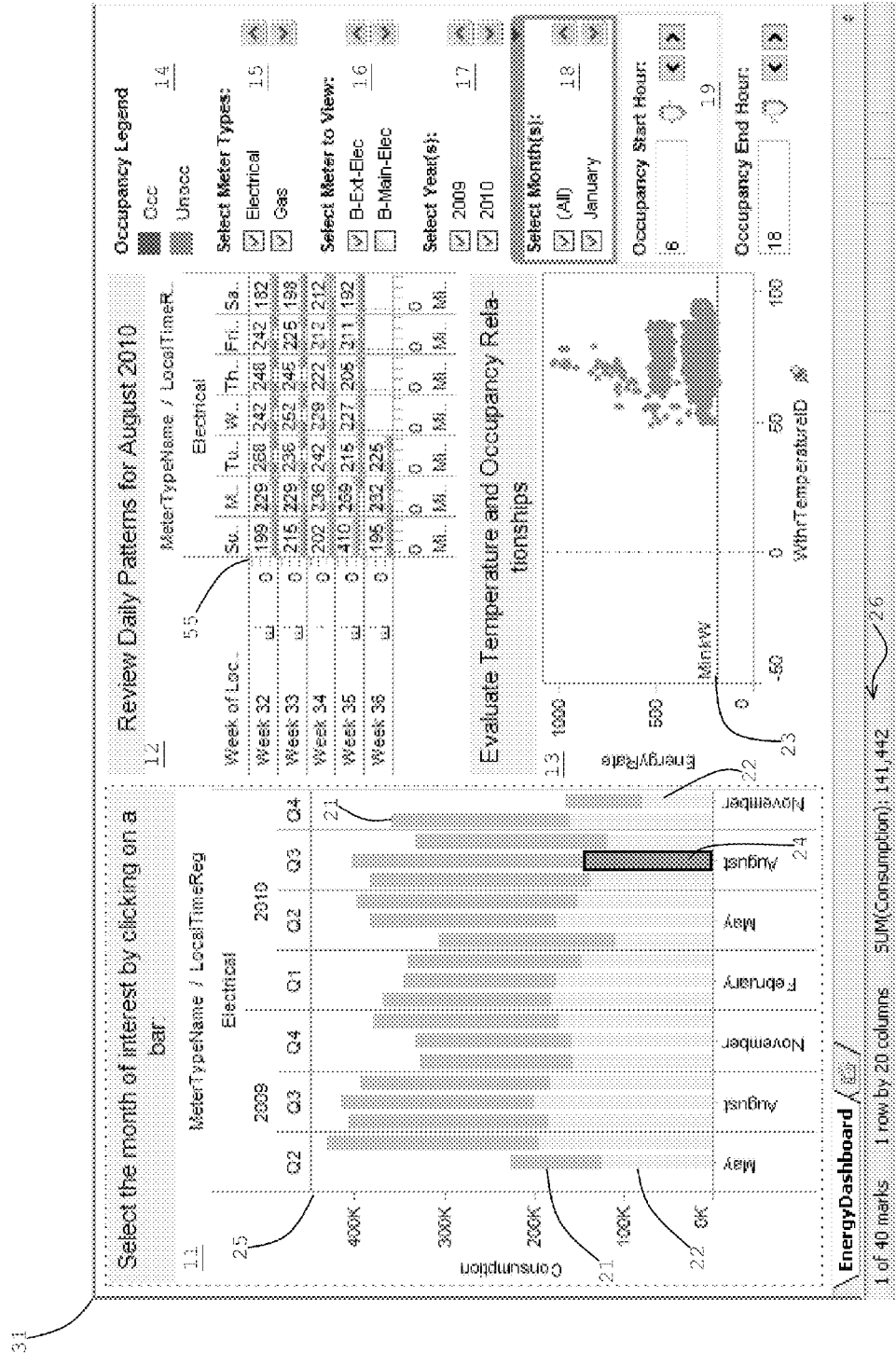
FIG. 2 is a diagram of an illustrative example of dashboard showing energy related information.

FIG. 2 is a diagram of an illustrative example energy dashboard 10 showing a graph 31 of certain information. The information may be displayed in other kinds of formats. The present dashboard example may be designed with various tools. An example tool may incorporate Tableau™ reader. Energy dashboard 10 may have panes 11, 12 and 13. The diagram shows a linking between a monthly view in pane 11 and details in panes 12 and 13. There may be an occupancy legend 14 showing one shading, symbol or color for occupied periods another shading, symbol or color for unoccupied periods. An area 15 may be for selection of meter types such as electrical, gas and water. Any combination of meter types, including all of them may be selected. Various types of meters may be added to or subtracted from the selection. An area 16 may be for a selection of meters to view. Instances of meters as shown in this example may incorporate A-main-elec, B-ext elec, B-main-elect, Boiler2_3Gas, Boiler4Gas, Boiler5Gas, Boiler6Gas, C-Main-Elect, Main-Gas, Main-Water, Total Electrical and (All). Various types of meters may be added to or subtracted from the selection.

An area 17 may provide for a selection of one or more years to observe with the dashboard. In the present example, the available years are 2009 and 2010. Other years may be added. An area 18 may provide for a selection of one or more months. Any combination of the months of a year may be selected. An "(All)" box may be instead checked. Area 19 may indicate an occupancy start hour and an occupancy end hour. The start and end hours may be individually adjusted in increments of one-half hour.

Pane 11 may indicate a visual portrayal of energy consumption by years, quarters and months for one or more electrical, gas and/or water meters at a site. The consumption may be broken into occupied and unoccupied periods 21 and 22, respectively, and can be indicated by contrasting shading, symbols or colors.

Pane 12 may indicate a visual portrayal of daily patterns of utility use for various lengths of time. Consumption or demand may be indicated by occupancy or non-occupancy. Numerical indications of consumption or demand may be indicated for each day.

Pane 13 shows a graph 23 of energy rate versus outdoor air temperature. Also, occupancy status (i.e., occupancy or non-occupancy) may be indicated in the data with shading, symbols or color.

Panes 11, 12 and 13 may present their respective areas of information in a variety of formats. Also, the panes may be arranged in a different order and/or different relative sizes. Examples of visualizations are present in numerous Figures described herein.

Graph 31 of the energy dashboard may be noted with more specificity. Pane 11 shows electrical consumption of three quarters of 2009 and the four quarters of 2010. A portion 24 of the graph in pane 11 may be clicked on to obtain an amount of energy consumption during August 2010 for non-occupancy. The clicked-on portion 24 may be highlighted with greater contrast border around the bar in graph 25. At the bottom of graph 31, a consumption of 141,442 units at item 26 for the time shown in pane 11 is shown at the bottom of dashboard graph 31.

Figure 3:
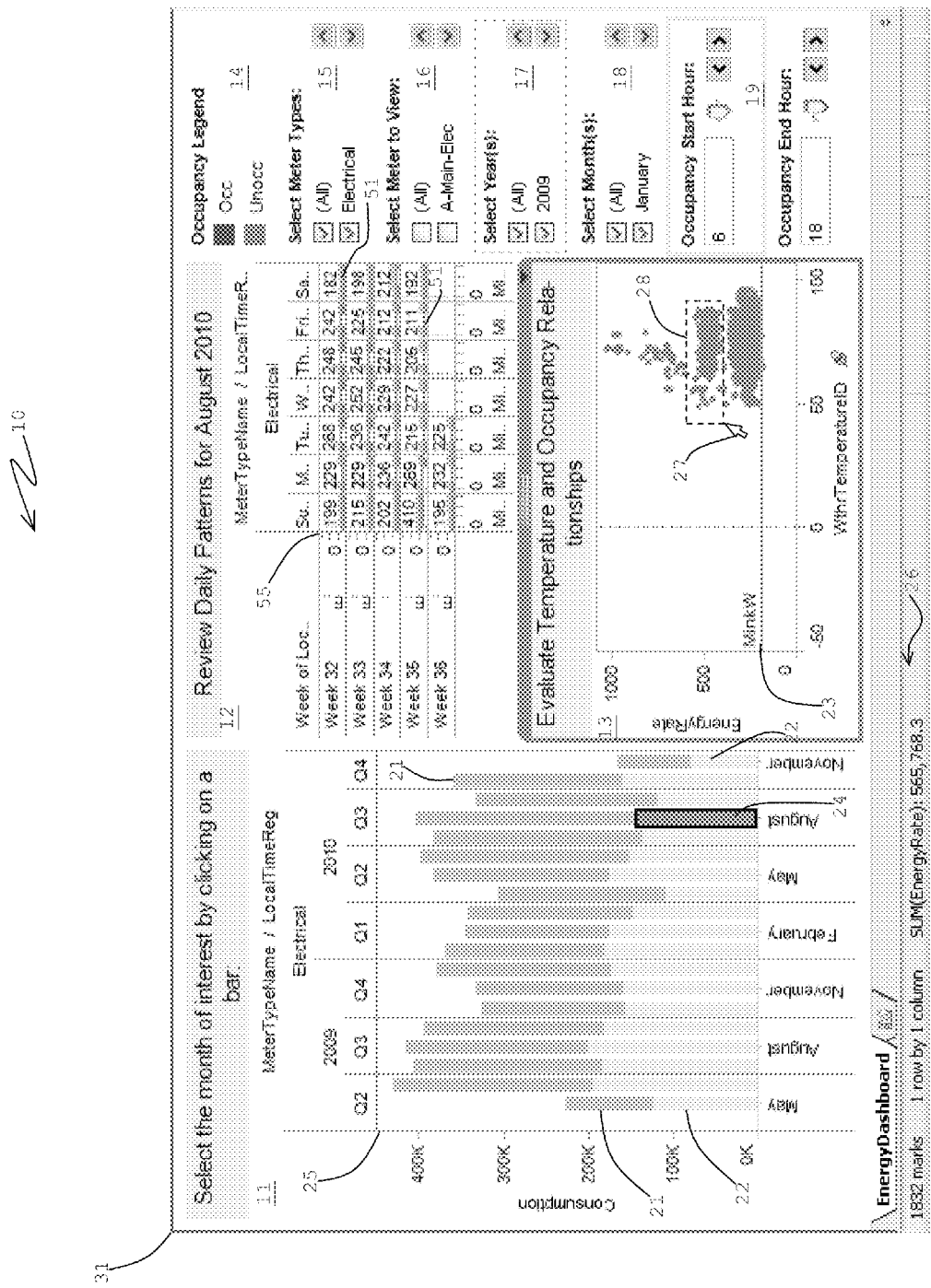
FIG. 3 is a diagram of data selection using a mouse cursor to draw a box around a portion of the data plotted in graph.
Figure 4:
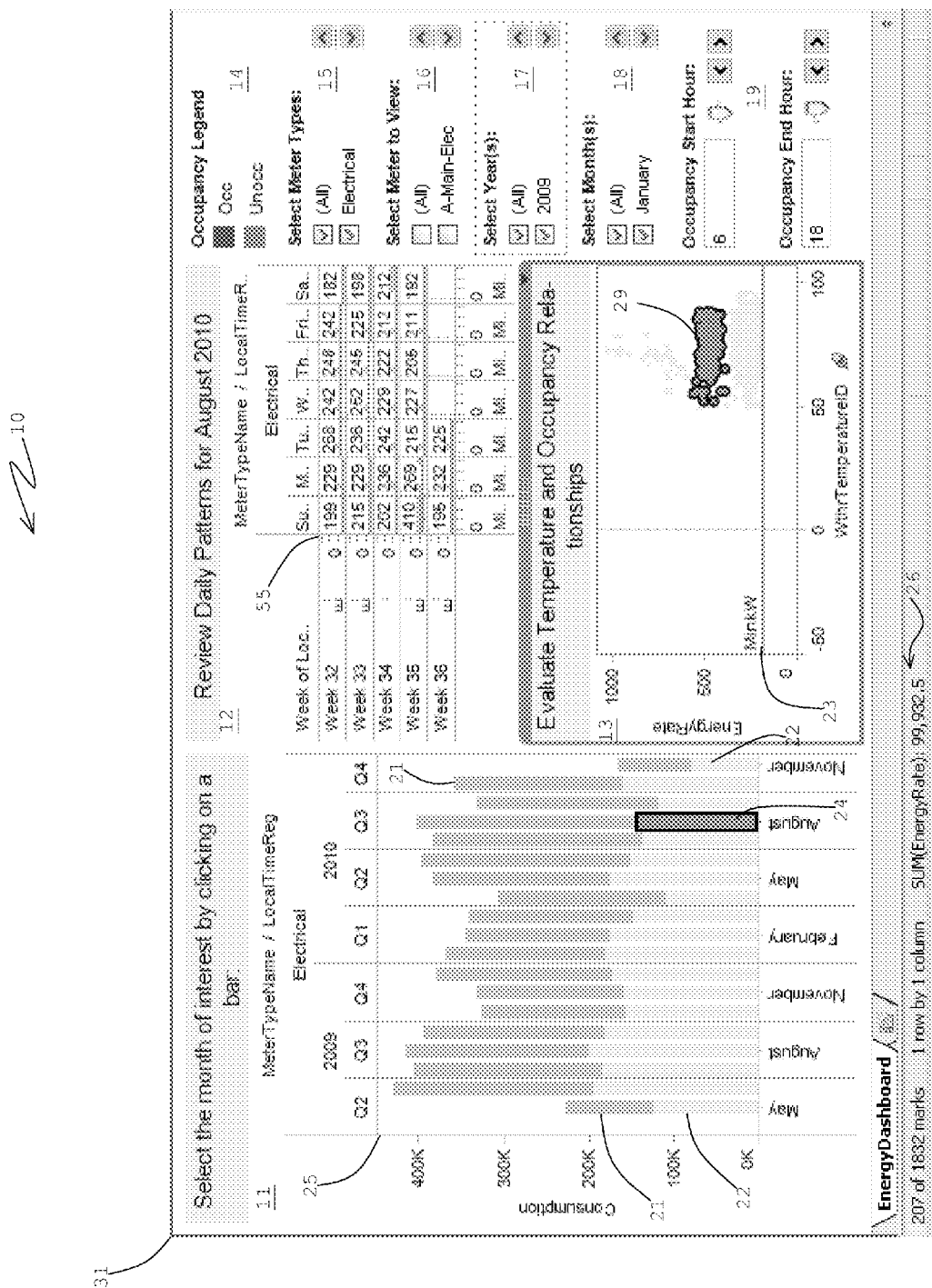
FIG. 4 is a diagram illustrating the selection made in FIG. 3.

On dashboard 10 in FIG. 3, one may take a mouse cursor 27 and draw a box 28 around a portion of the data plotted in graph 23. This technique isolates the data within box 28 to result in that data having a border 29 around the data as shown in FIG. 4. The other data not within border 29 appears to almost vanish from graph 23.

Dashboard of FIG. 4 shows that temperature may drive the calendar view. The dashboard illustrates a dynamic combination of date/time context and outdoor air temperature context.

Pane 12 shows the days of August 2010 with a bar 51 of shading, symbol or color at the bottom of the boxes with the numbers of a minimum daily consumption: This shading, symbol or color may indicate the non-occupancy consumption shown by the data which in the present example in FIGS. 2 and 3 reveal the amount of such consumption. When a portion data in graph 23 is isolated within border 29, just that data may be shown in pane 12 for the various days of August, which amounts to a corresponding bar 51 being reduced at or removed from the days since the selected data in box 28 is not necessarily fully represented by the bars on those days. The same technique may be applied to other portions of data selected in pane 11.

Figure 5:
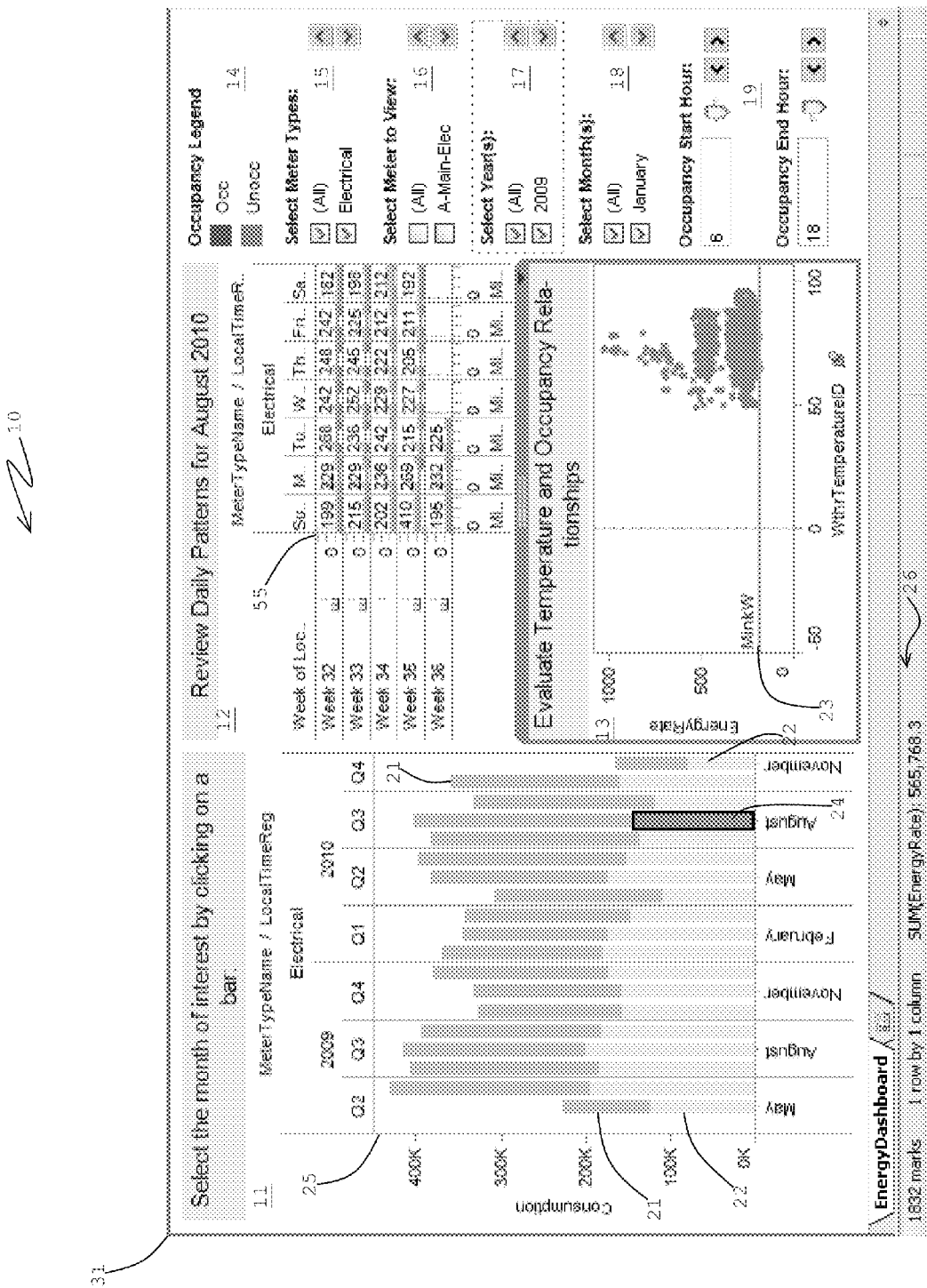
FIG. 5 is a diagram where a temperature and occupancy pane is selected, and a sum of an energy use is shown for a non-occupancy selection.

In FIG. 5, when pane 13 is selected, the sum of the energy rate at item 26 is shown to be 565,768.3. With the data selected by border 29 in FIG. 4, the sum of the energy rate at item 26 is shown to be 99,932.5.

Figure 6:
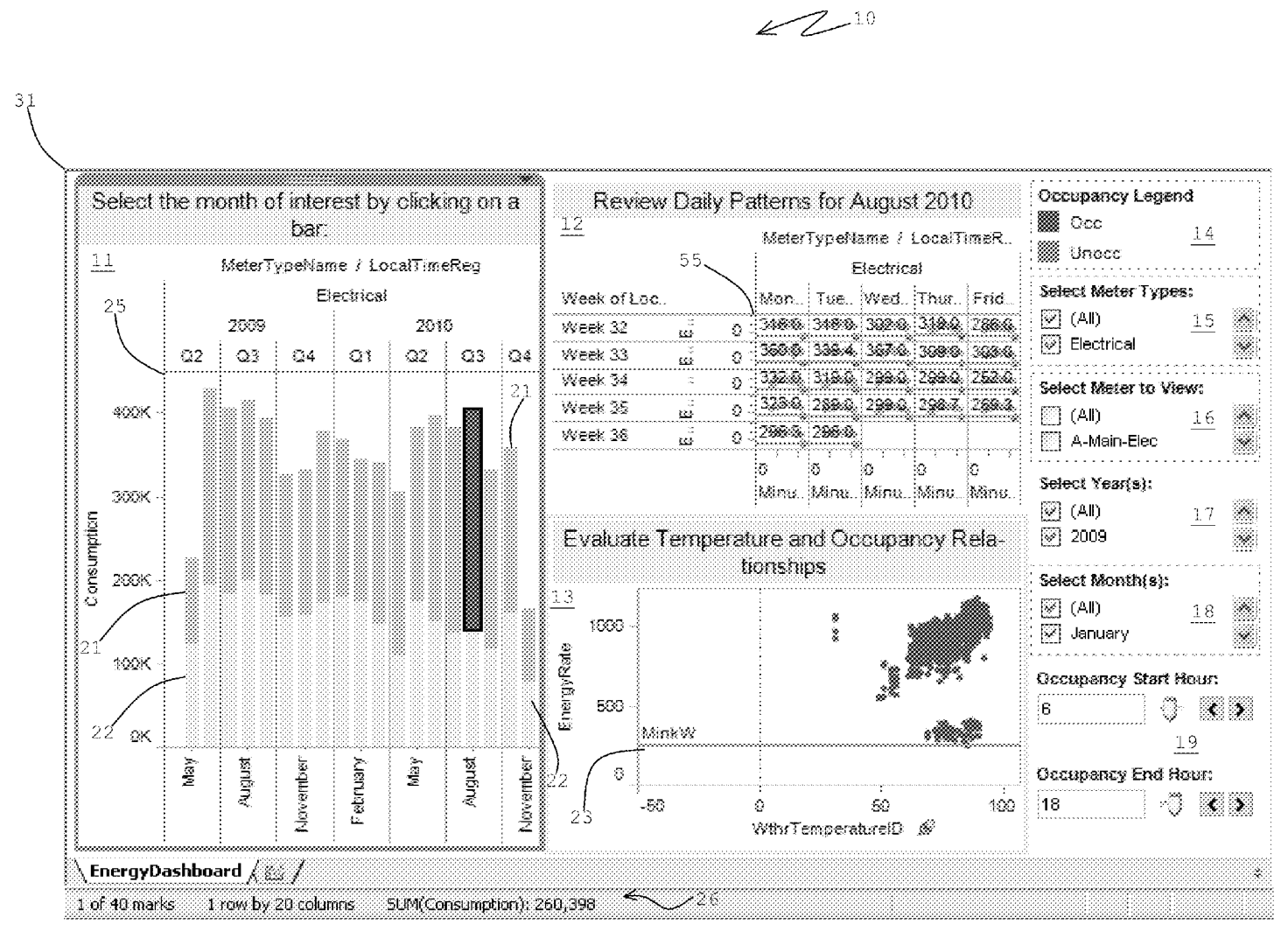

FIG. 6 is another example using a different occupancy context (occupied versus unoccupied) from the monthly view. In this Figure, a bar 21 in graph 25 may be selected for August 2010. Bar 21 may represent consumption during the occupied period for the building. The occupied period for the building may be defined at area 19. A numerical amount of total energy consumption during the period of occupancy for that period of 2009 and 2010 shown in pane 11 may be indicated at item 26 which in the present illustrative instances is 260,398 units. The minimum energy consumption for each day of August may be represented by the daily calendar in pane 12 with a number of units of consumption for each day of August. For instance, a minimum amount of electrical consumption for Monday, Aug. 1, 2010, is shown to be 316.0 units. The magnitude and time of consumption may be indicated by a bar in the box showing the units for the day. An occupancy bar may have a significant height from the bottom of the box. The length of the bar may indicate an amount of consumption for the particular day.

Graph 23 of pane 13 reveals a plot of the energy rate versus an outdoor air temperature. Similar techniques of isolating data in graph 23 may be utilized like those described for data of the unoccupied period data in FIGS. 3 and 4.

Figure 7:
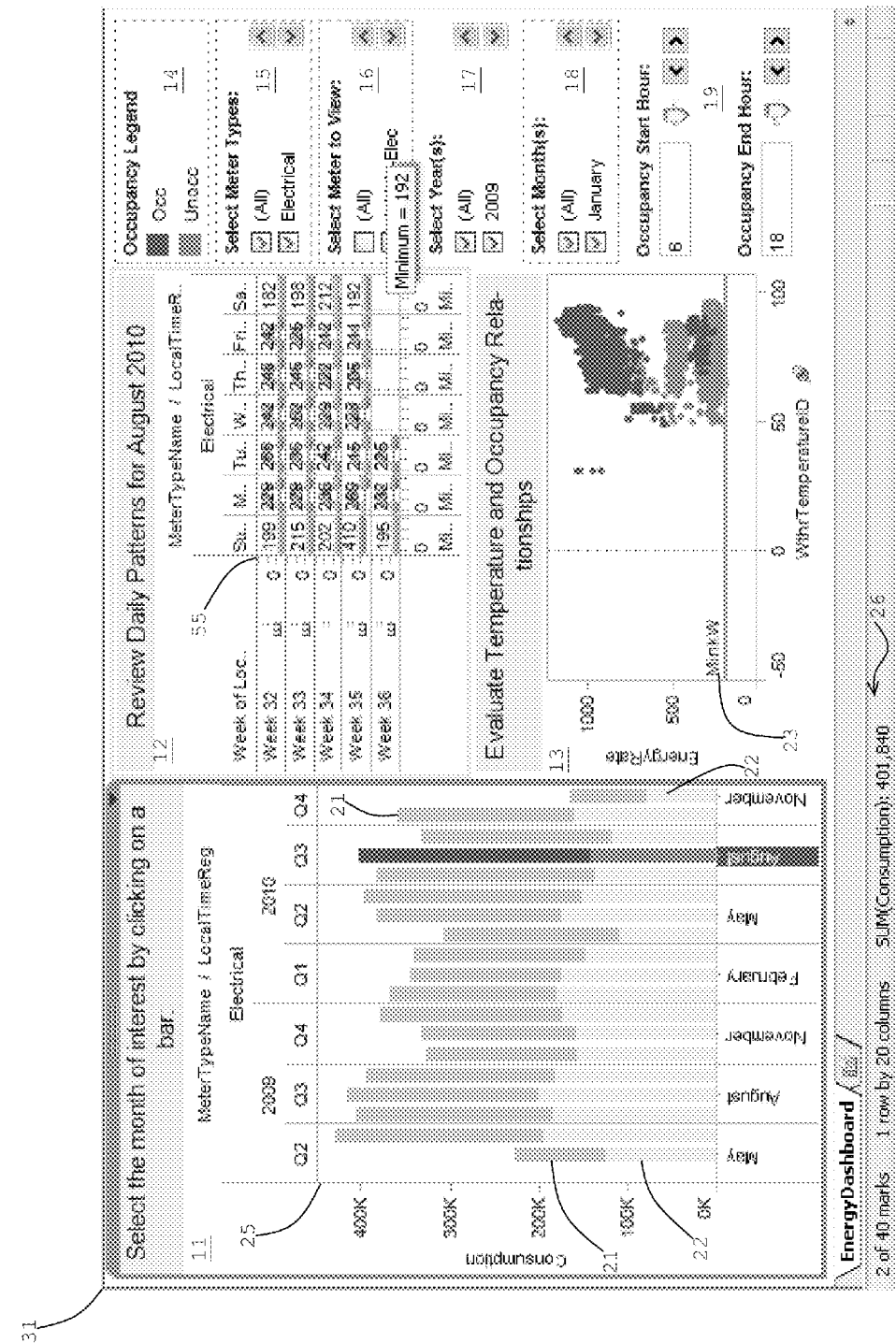
FIG. 7 is a diagram showing both contexts for a single month of energy use.

In FIG. 7 shows both contexts for a single month. Bars 21 and 22, representing energy use during occupied and non-occupied periods, respectively, for August 2010, may be selected by clicking on the month portion at the bottom of graph 25 in pane 11. The sum energy use at item 26 is 401,840 units. The consumption for non-occupancy bar 22 at item 26 in FIG. 2 is 141,442. The sum energy use for the occupancy bar 21 at item 26 in FIG. 6 is 260,398. It may be noted that the two latter items indicated energy use add up to be equal to the sum energy use indicated at item 26 in FIG. 7.

Pane 12 reveals a calendar revealing minimum electrical consumption on a daily basis for August 2010. Different shades, symbols or colors may represent both occupancy and non-occupancy consumptions for each day. The lower bar or shading in a day block may represent energy consumption during the unoccupied periods. The middle bar or shading may represent energy consumption during occupied periods. A position from between the ends of each daily box may represent a time of the respective day. It may be noted that no two bars representing the occupied and unoccupied periods overlap each other since the occupied and unoccupied periods are mutually exclusive. It may be noted that the non-occupancy time may occur at the beginning and end of a representative weekday with the occupied time situated in the middle between the unoccupied. These times may be indicated by area 19.

Pane 13 reveals the graph 23 with energy rate versus temperature ID with data of both occupied and unoccupied period energy use for August 2010.

Figure 8:
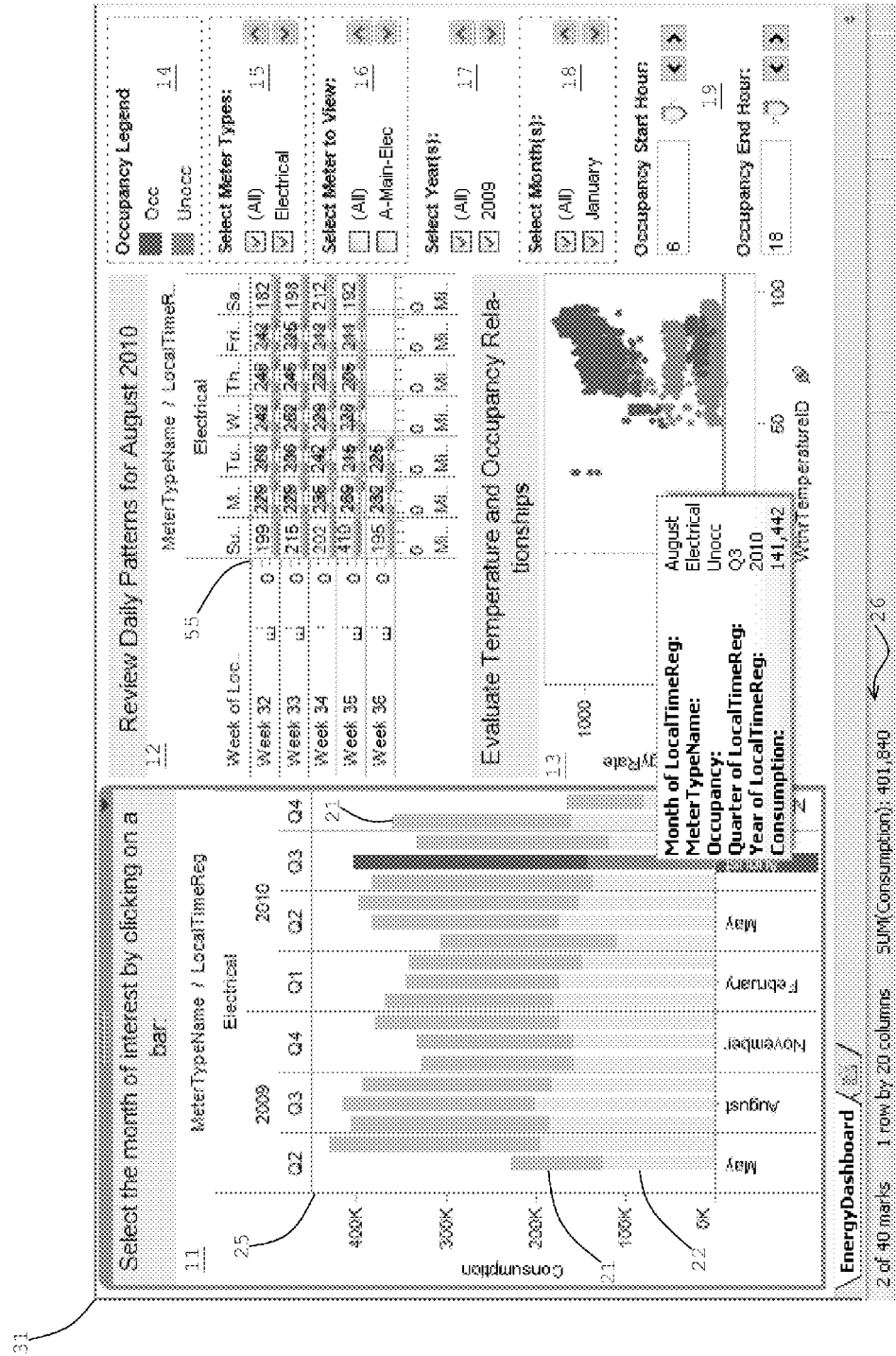
FIG. 8 is a diagram of a tool tip that highlights detail of a portion of a graph representing an unoccupied period for a selected month.
Figure 9:
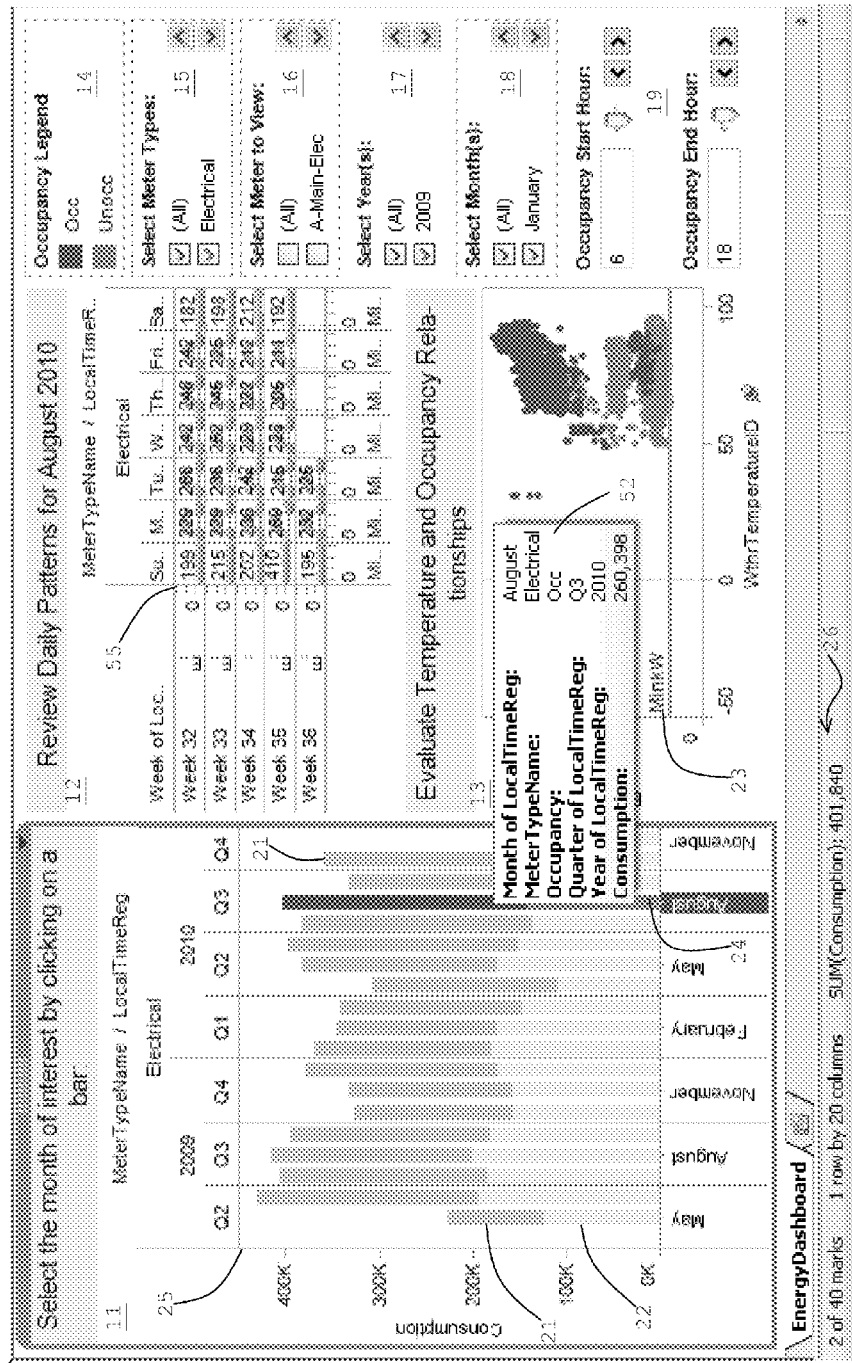
FIG. 9 is a diagram of a tool tip that highlights detail of a portion of a graph representing an occupied period for the selected month.

FIG. 8 reveals a tool tip to highlight detail. The tool tip may be a function built into the present approach. One may have a monthly display, calendar display occupancy context and outdoor air conditions along with the tool tip. A mouse cursor may be clicked on bar 21 in pane 11 to result in information window or tool tip 52 revealing information relative to that portion of graph 25. For example, a month of timestamp, meter type name, occupancy, quarter of timestamp, year of timestamp and consumption may be shown by tool tip 52. The information shown in the example tool tip 52 is respectively August, electrical, Unocc, Q3, 2010 and 141,442. Clicking on bar 22 of graph 25 may result in another tool tip 52 revealing the same information except that occupancy is Occ and consumption is 260,398, as shown in FIG. 9.

Figure 10:
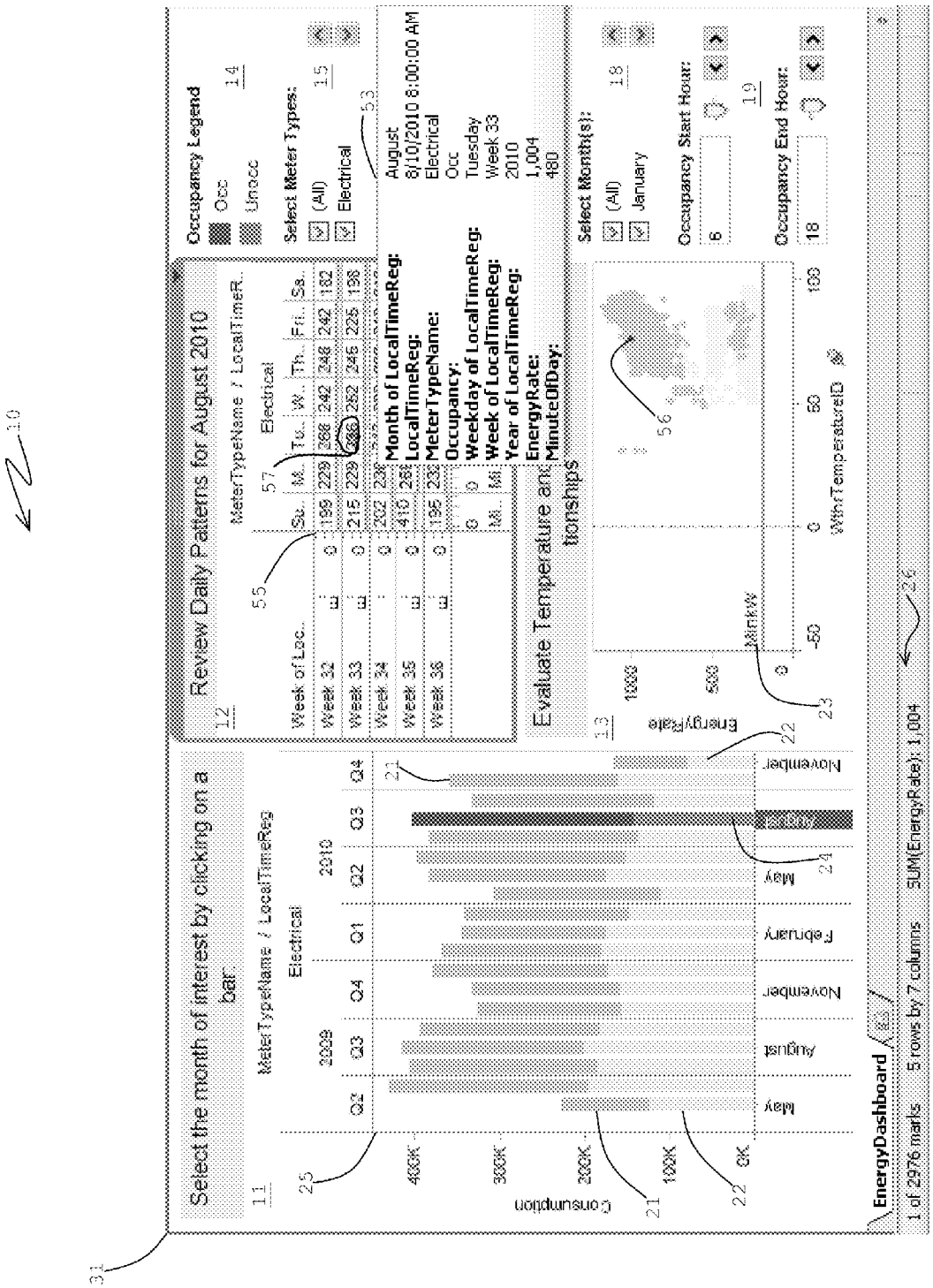
FIG. 10 is a diagram of a tool tip that highlights detail of a particular day in a calendar on the dashboard.
Figure 11:
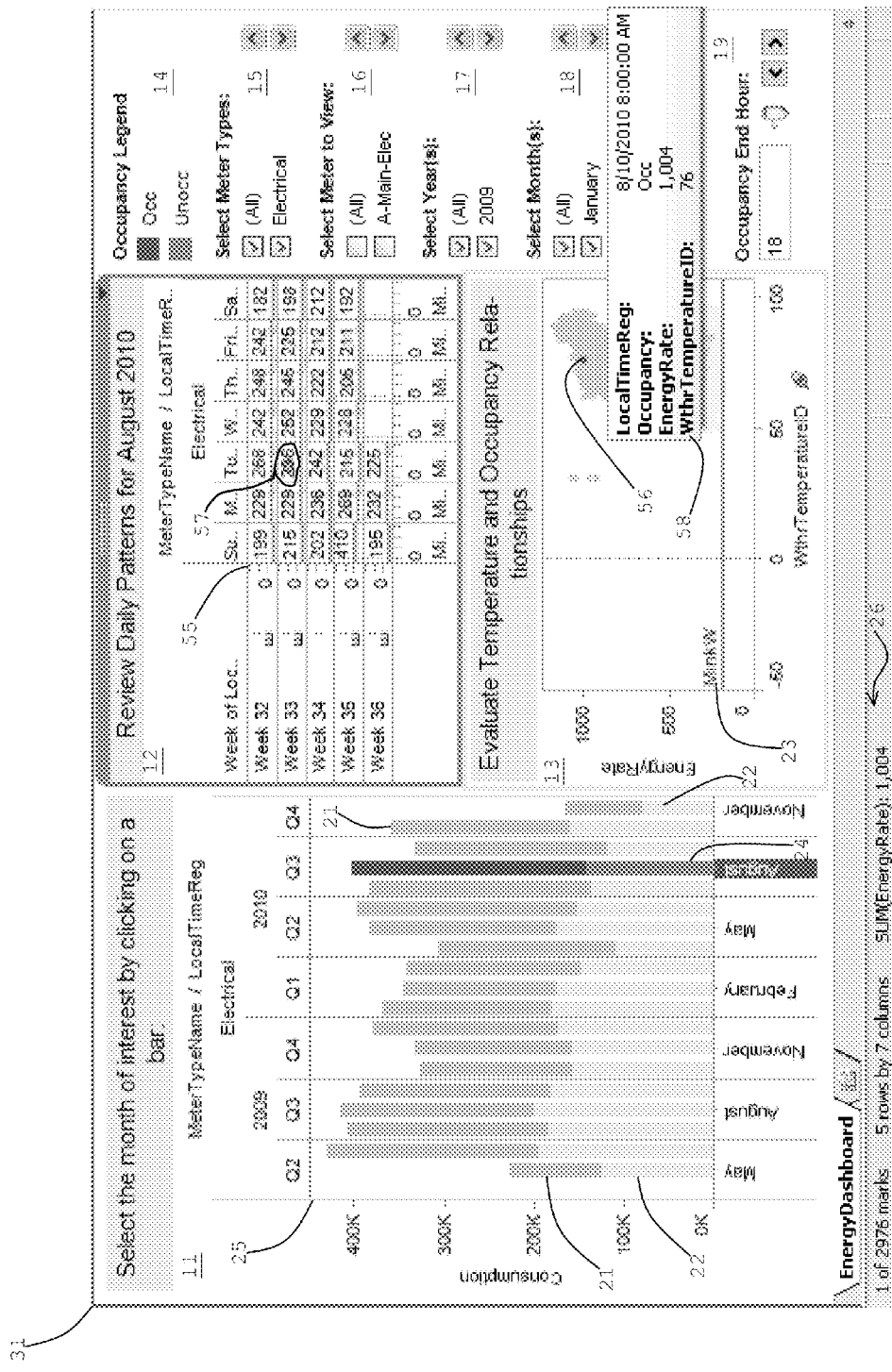
FIG. 11 is a diagram of a tool tip that highlights detail of a data point in a scatter plot.

In the same fashion, the mouse cursor may be clicked on a particular portion of a day in calendar 55 and a tool tip 53 may appear for a particular time of day indicating information such as month of timestamp, timestamp, meter type name, occupancy, weekday of timestamp, year of timestamp, energy rate and minute of the day. In the particular example of FIG. 10, the items of information in tool tip 53, respectively, are August, Aug. 10, 2010 8:00:00 AM, Electrical, Occ, Tuesday, Week 33, 2010, 1004 energy rate and 480 minute of the day. Because of clicking on a certain point of the day in calendar 55 as indicated by a dot in circle 57, a corresponding data point 56 stands out with the other data points losing contrast in graph 23 in pane 13 as shown in FIG. 11. The dashboard effectively shows highlighting from the calendar 55 to outdoor air scatter plot 23. One may move the cursor to point 56 and obtain another information box 58 which indicates information such as timestamp, occupancy, energy rate and outdoor air temperature. In the particular instance of box 58, the items of information, respectively, are Aug. 10, 2010 8:00:00 AM, Occ, 1,004 and 76.

Figure 12:
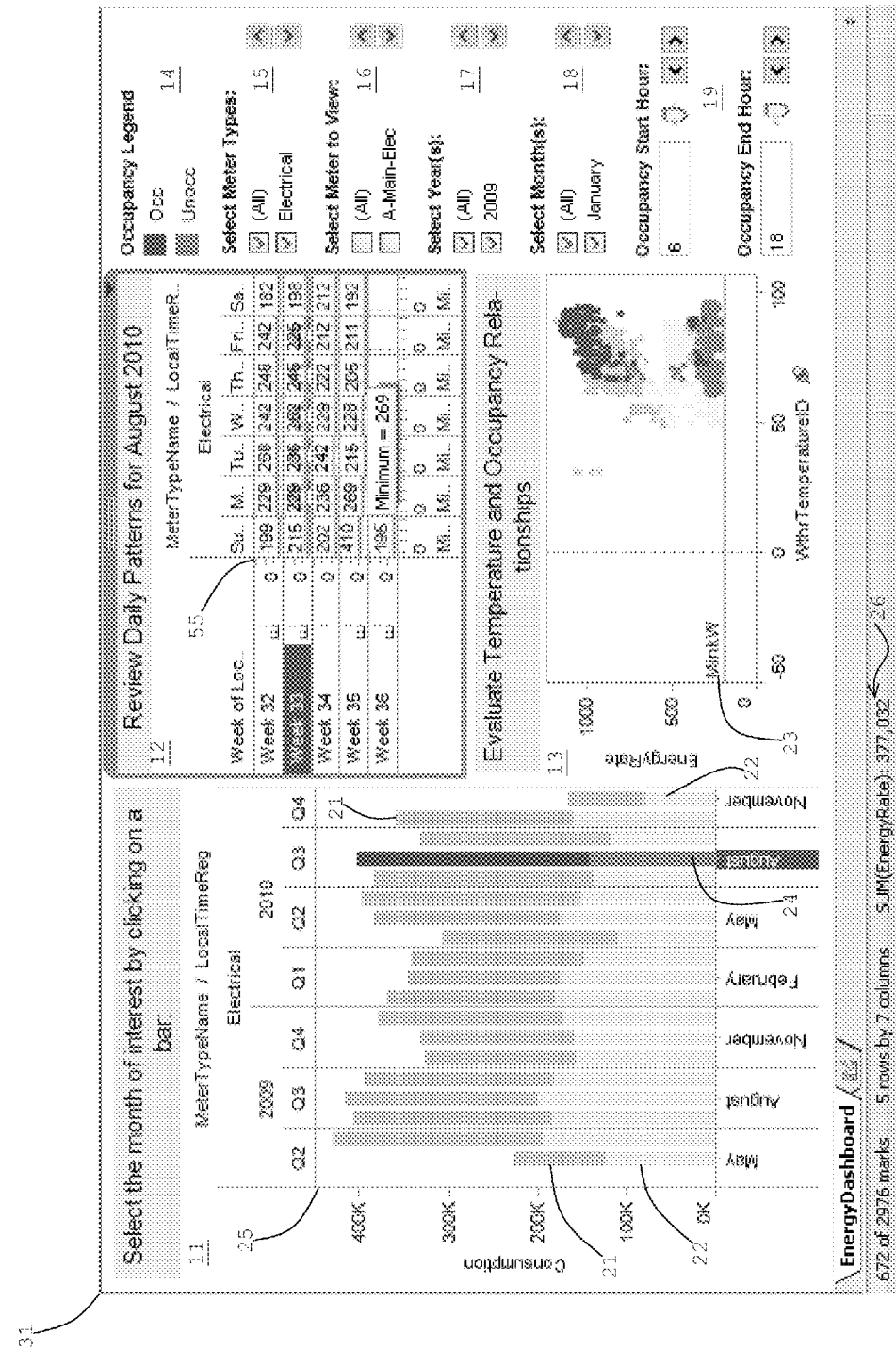
FIG. 12 is a diagram of a selection of several days of a week which drives weather dependency scatter plot.

Clicking the cursor on the dot in circle 57 (open area of pane 12) in calendar 55 may cycle the calendar from the dot presentation in FIG. 11 showing the bars of occupied and unoccupied period use for each day with all of the data plots in graph coming into full contrast in graph 23, as in FIG. 12. This Figure shows a multi-select of days in the calendar driving the outdoor scatter plot. Clicking the cursor again on the dot in circle 57 in FIG. 11 or any other data point in calendar 55 may return the calendar 55 to showing a clicked-on data point in circle 57 along with a corresponding data point 56 in graph 23 coming into full contrast and with the remaining data points in graph 23 coming into low contrast as in FIG. 11. A specific week in the month of August may be selected, such as week 33 as indicated in FIG. 12. The data relative to that week will stand out in calendar 55 at the bottom of the numbers and the corresponding data in graph 23 will keep their strong contrast, and the remaining data not a part of week 33 will assume a low contrast in the graph.

Figure 13:
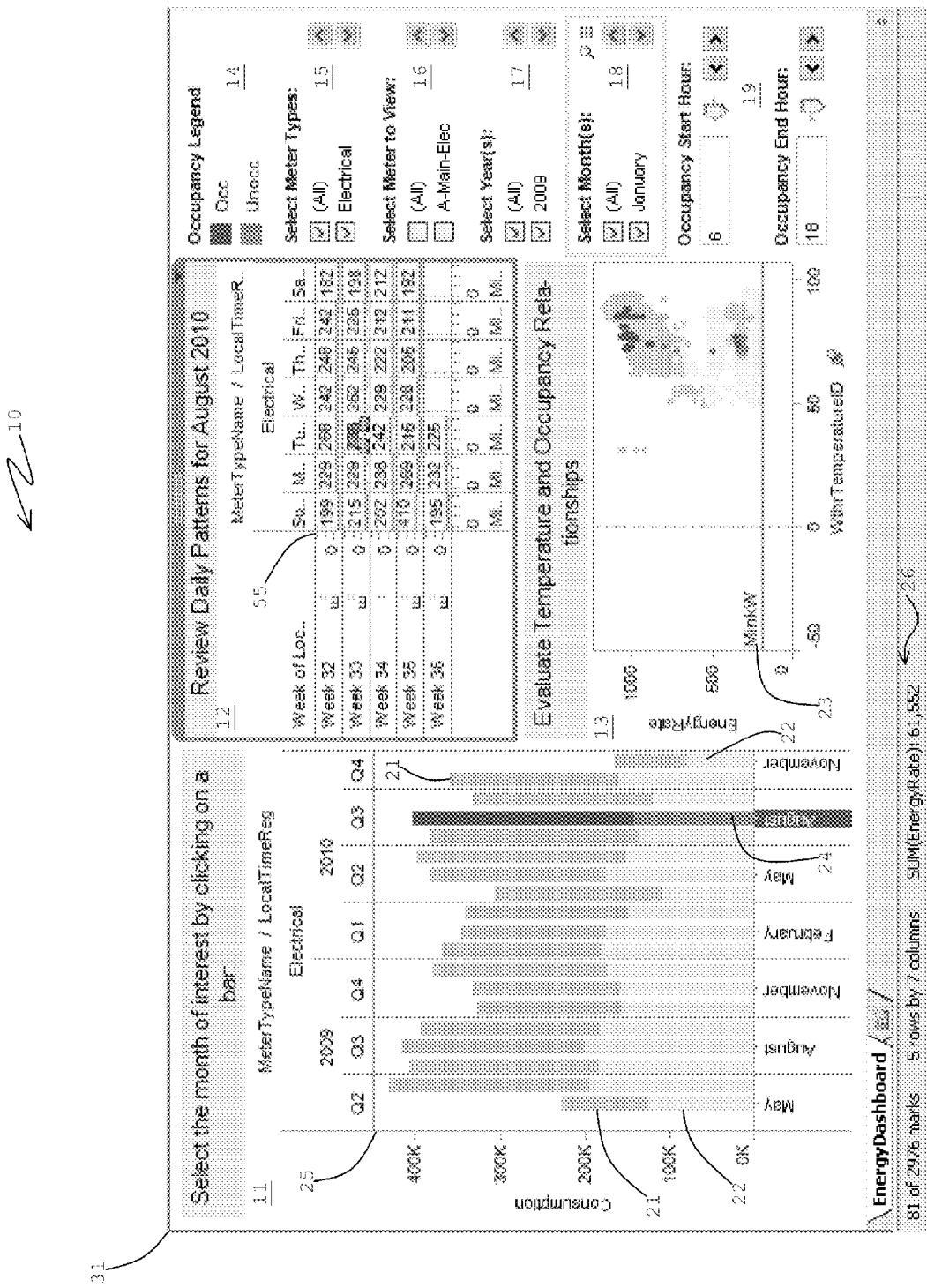
FIG. 13 is a diagram of a selection of a single day which drives the weather dependency scatter plot.
Figure 14:
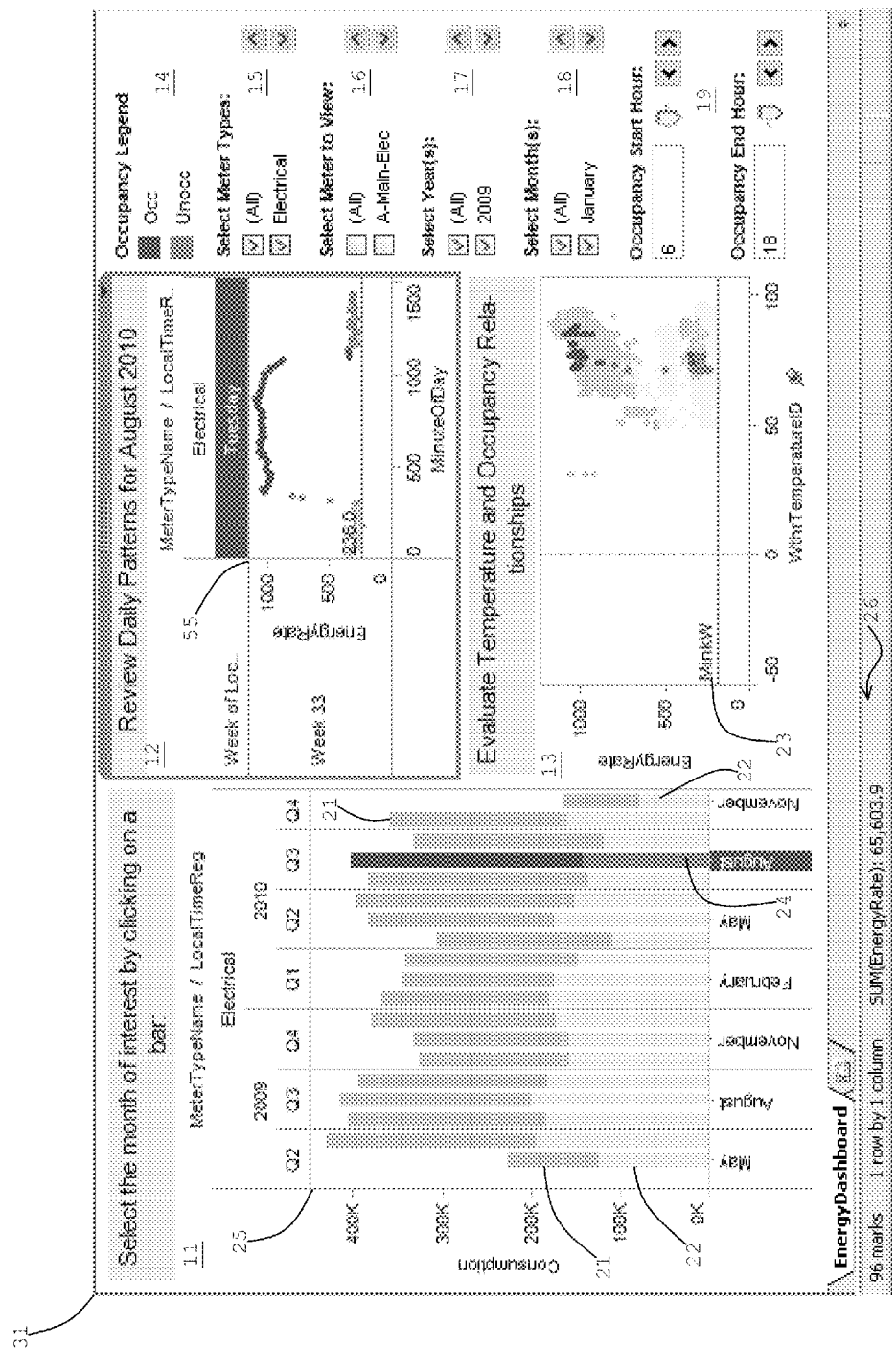
FIG. 14 is a diagram which shows a plot of a single day in the calendar pane.
Figure 15:
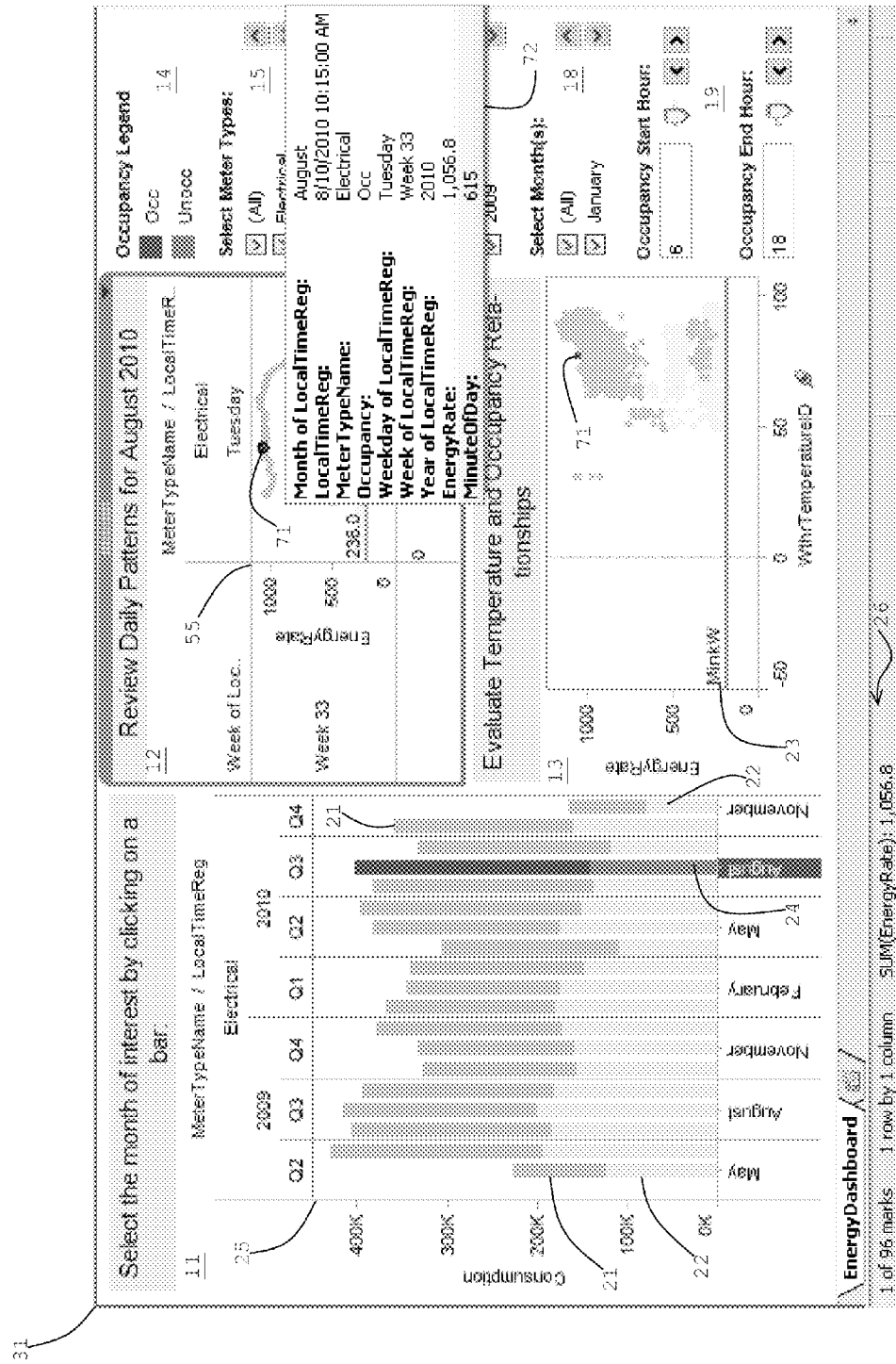
FIG. 15 is a diagram of a tool tip showing details of a data point in the single day plot of the calendar.
Figure 16:
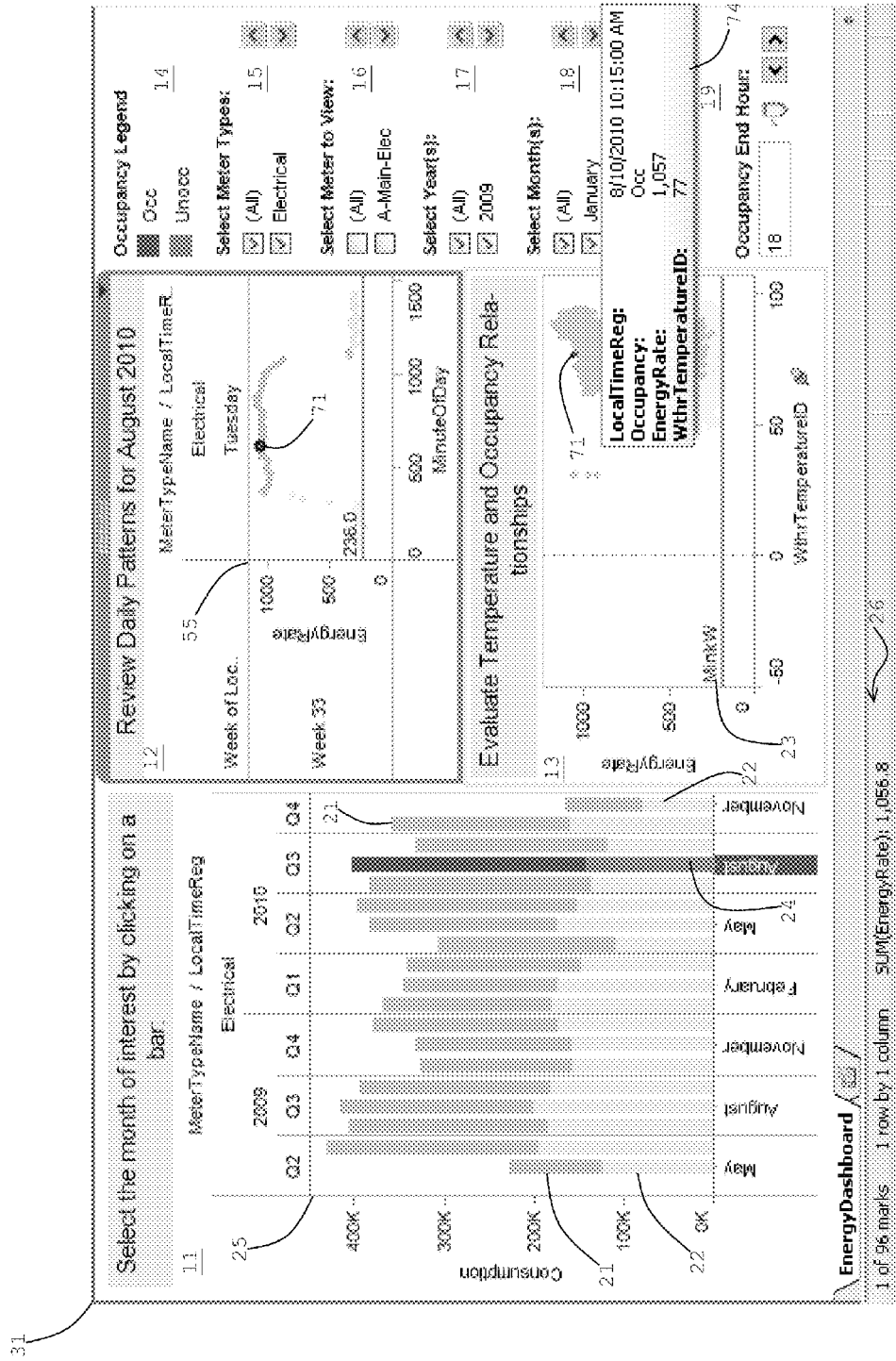
FIG. 16 is a diagram of a tool tip showing details of the same data point in the scatter plot.

FIGS. 13 and 14 show a result of clicking the cursor again on week 33 which results in an energy rate graph and dragging the cursor across the whole day for that day of week 33. A particular day may be clicked on such as Tuesday revealing a graph of consumption in terms of energy rate versus minute of the day, as indicated in FIG. 14. This click is effectively a zoom to a single day. Just the data for that day maintains the contrast in graph 23 of pane 13 while the other data assume a low contrast. The cursor may be set on a data point 71 of the plot for that Tuesday which may result in a tool tip 72, which provides details on a single point, as shown in FIG. 15. The same data point 71 may be found with the cursor in graph 23 to get a corresponding information box or tool tip 74 as shown in FIG. 16. Tool tip 74 may show details on a single point in the outdoor air scatter plot, although it shows different information.

Figure 17:
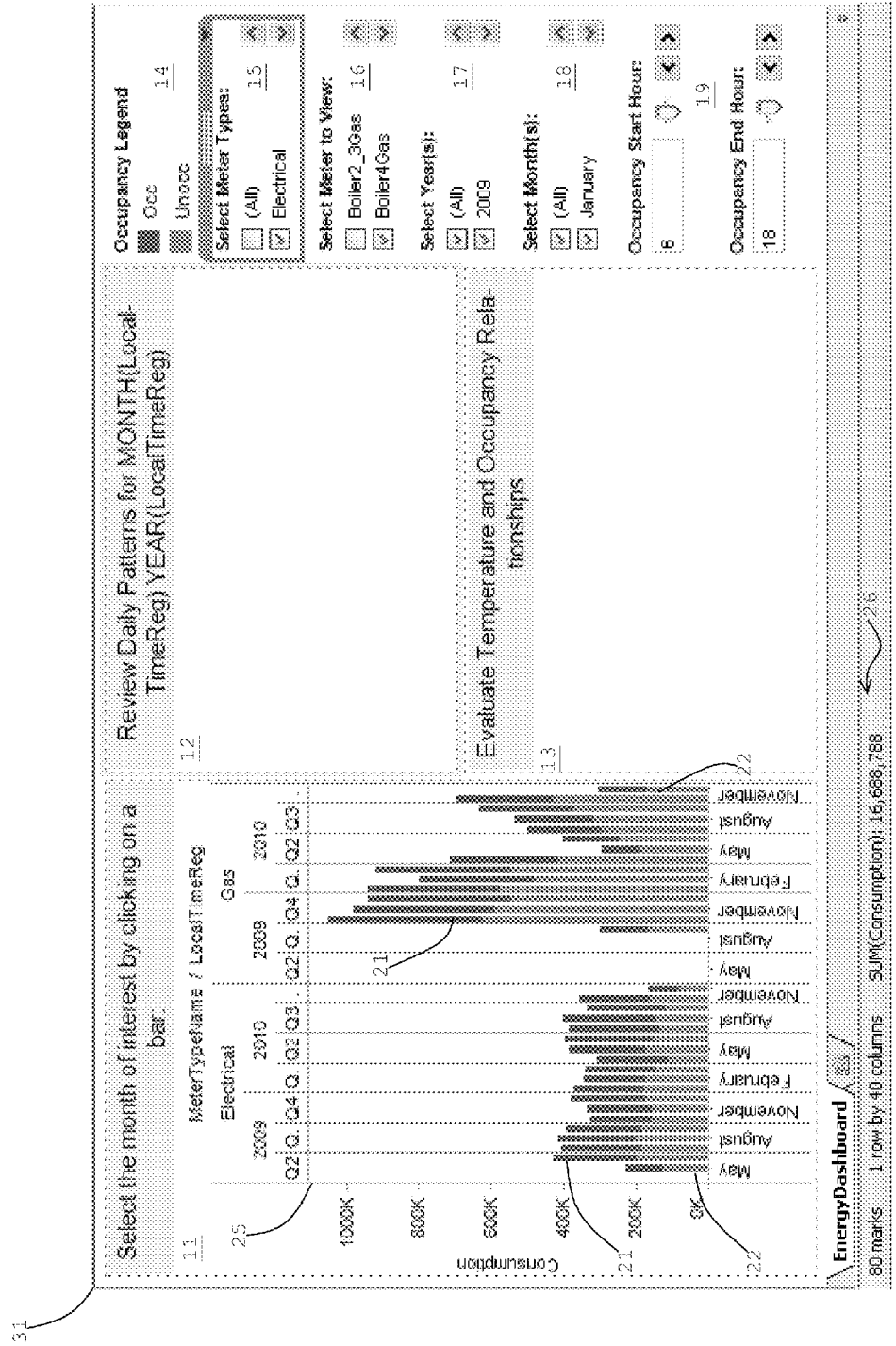
FIG. 17 is a diagram of the pane with a selection of over a year of data for several meter types.
Figure 18:
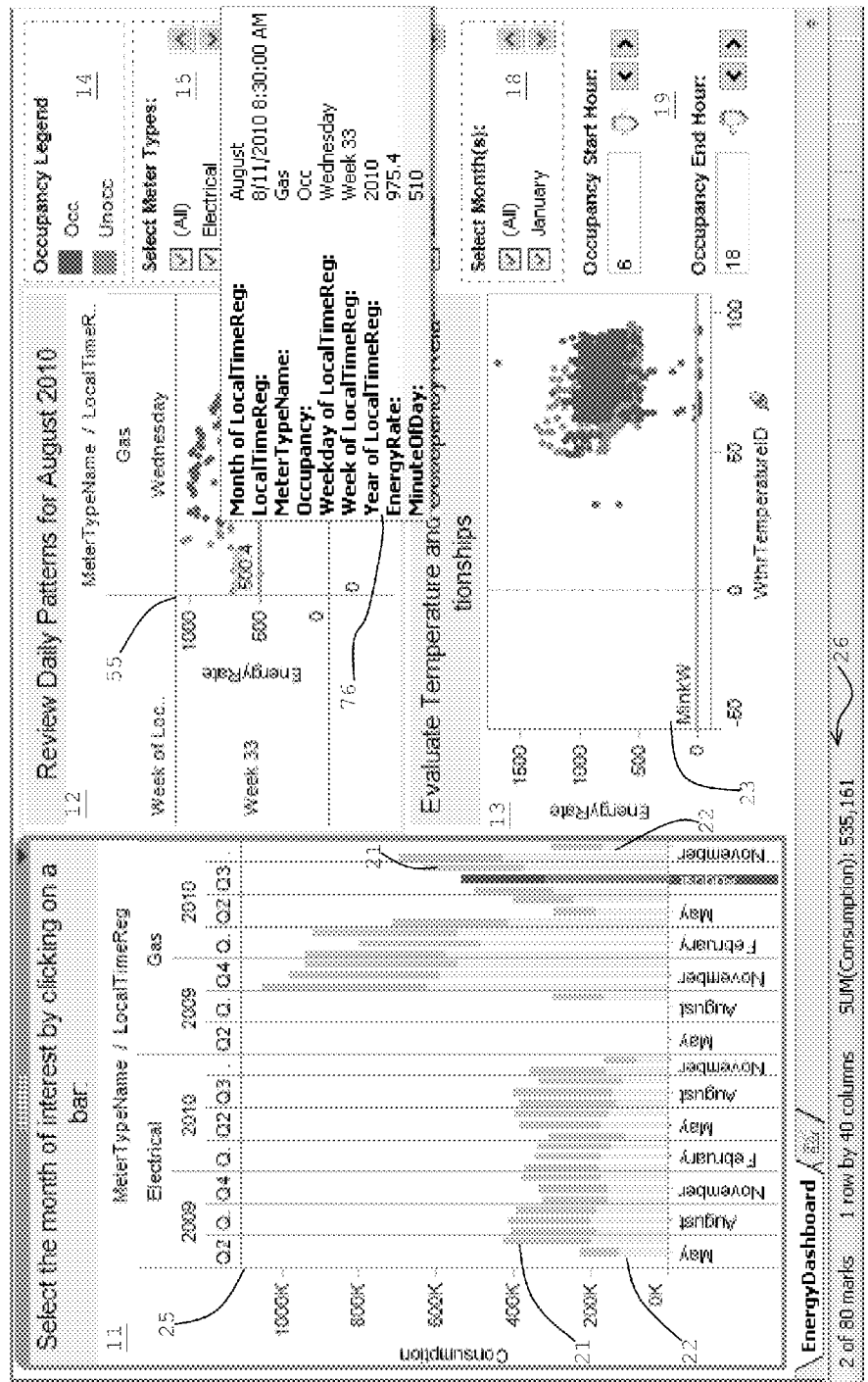
FIG. 18 is a diagram of a day plot for a gas type meter for both occupancy states with a tool tip on a data point showing details of that data point and the scatter plot revealing a plot for the whole month with the consumption indicated at the bottom of the dashboard.
Figure 19:
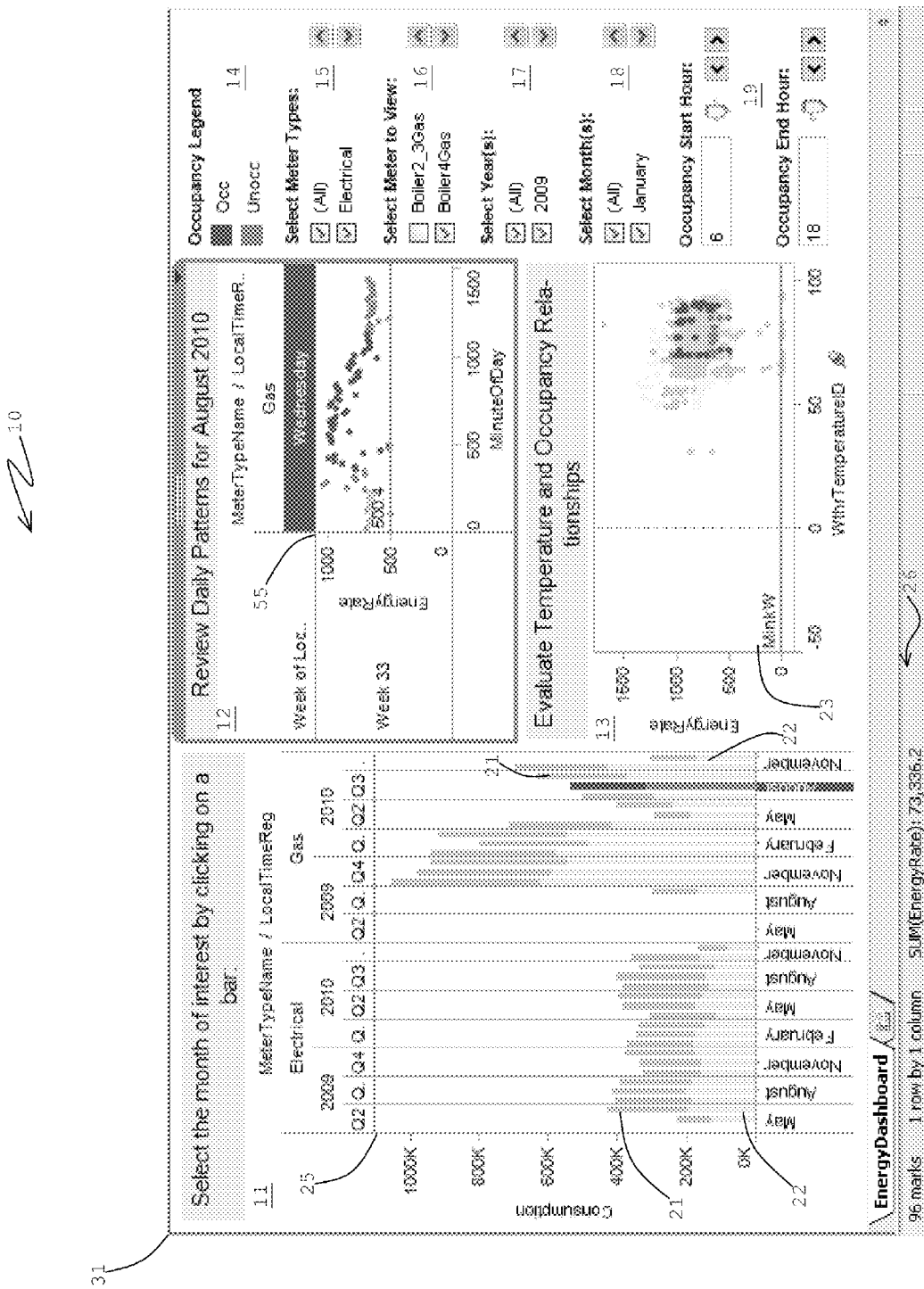
FIG. 19 is a diagram of the day plot but with the scatter plot revealing the data point for just the one day shown in the calendar.
Figure 20:
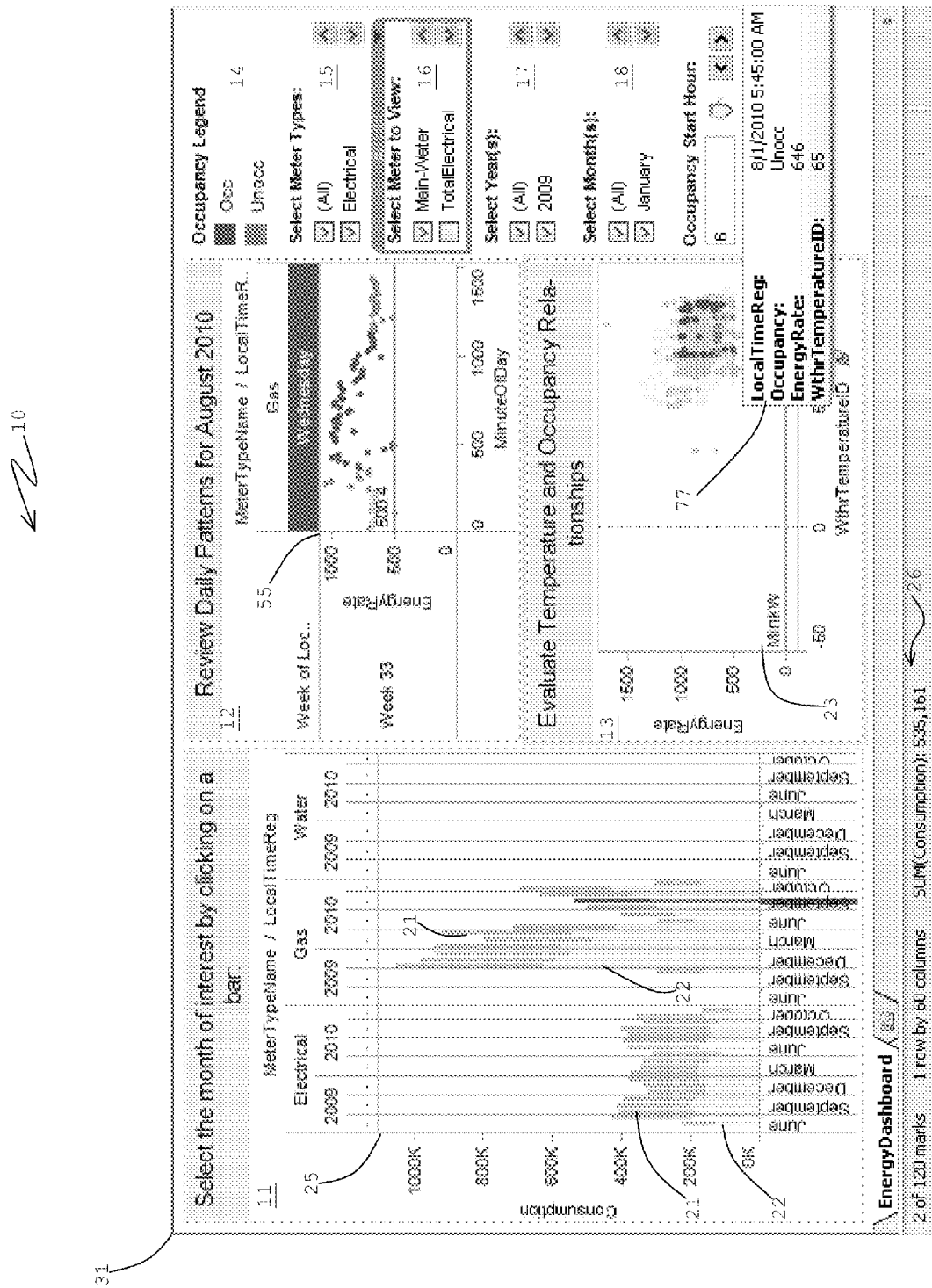
FIG. 20 is a diagram of the day plot with a tool tip on a data point in the scatter plot and three meter types select in the left pane.

In FIG. 17, a gas meter to view may be selected in area 16 such as "Boiler4Gas". Information about gas consumption may then also appear in a similar manner as the information already noted in graph 25 of pane 11. The cursor may be set on August 2010 under the gas portion of graph 25 and clicked on it. The daily pattern of graph 55 in pane 12 may switch over to the gas meter type. In FIG. 18, data for gas consumption may appear such as at item 26 which shows 535,161 units. The cursor may be placed on a data point for as in FIG. 18 to get an information box 76 in graph 55 of pane 12. The associated data for that day may be selected in pane 12. FIG. 18 shows up with a dark contrast in graph 23 of pane 12 shown in FIG. 19. In FIG. 20, an information box 77 may be obtained by placing the cursor on a data point in graph 23 of pane 13. The data points in graph 23 may be for gas consumption for the whole month of August 2010 in FIG. 18. However, clicking the cursor on Wednesday in calendar 55 may result in only the data for Wednesday in graph 23 retaining the same contrast, whereas the gas data for the remaining portion of August recedes into a low contrast as indicated in FIG. 19.

Pane 11 of FIG. 20 indicates an addition of another type of meter in graph 25, such as for water consumption, for the same period of time as that for electrical and gas. However, in this instance there are no data of consumption. Other kinds of meters may be added to the present system as desired. The same techniques may used for observing data from newly added meters as indicated for electrical and gas data.

Figure 21:
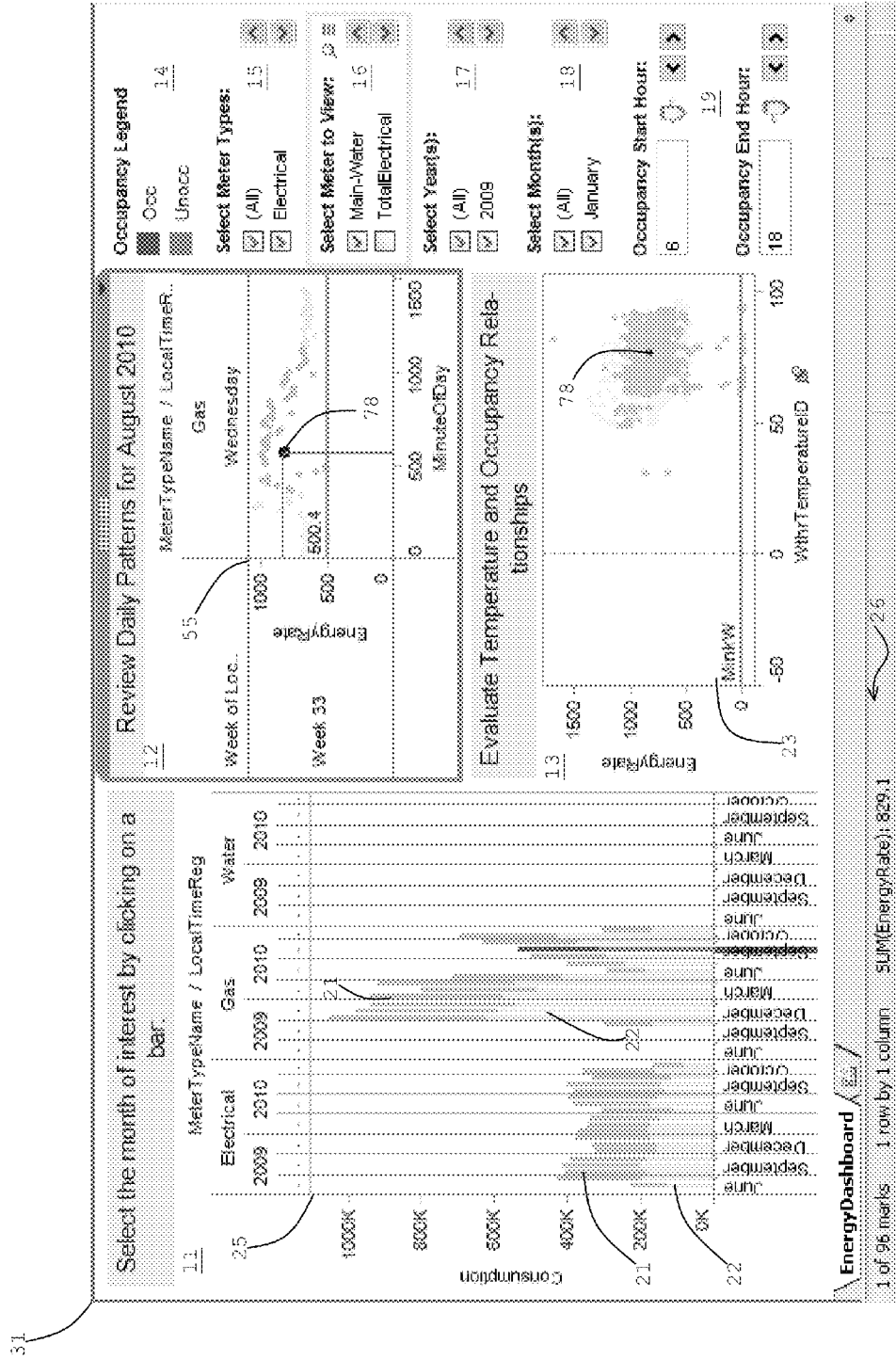
FIG. 21 is a diagram of the day plot with a selected data point having lines from the point to respective axes for a reading of energy rate and minute of the day, respectively.
Figure 22:
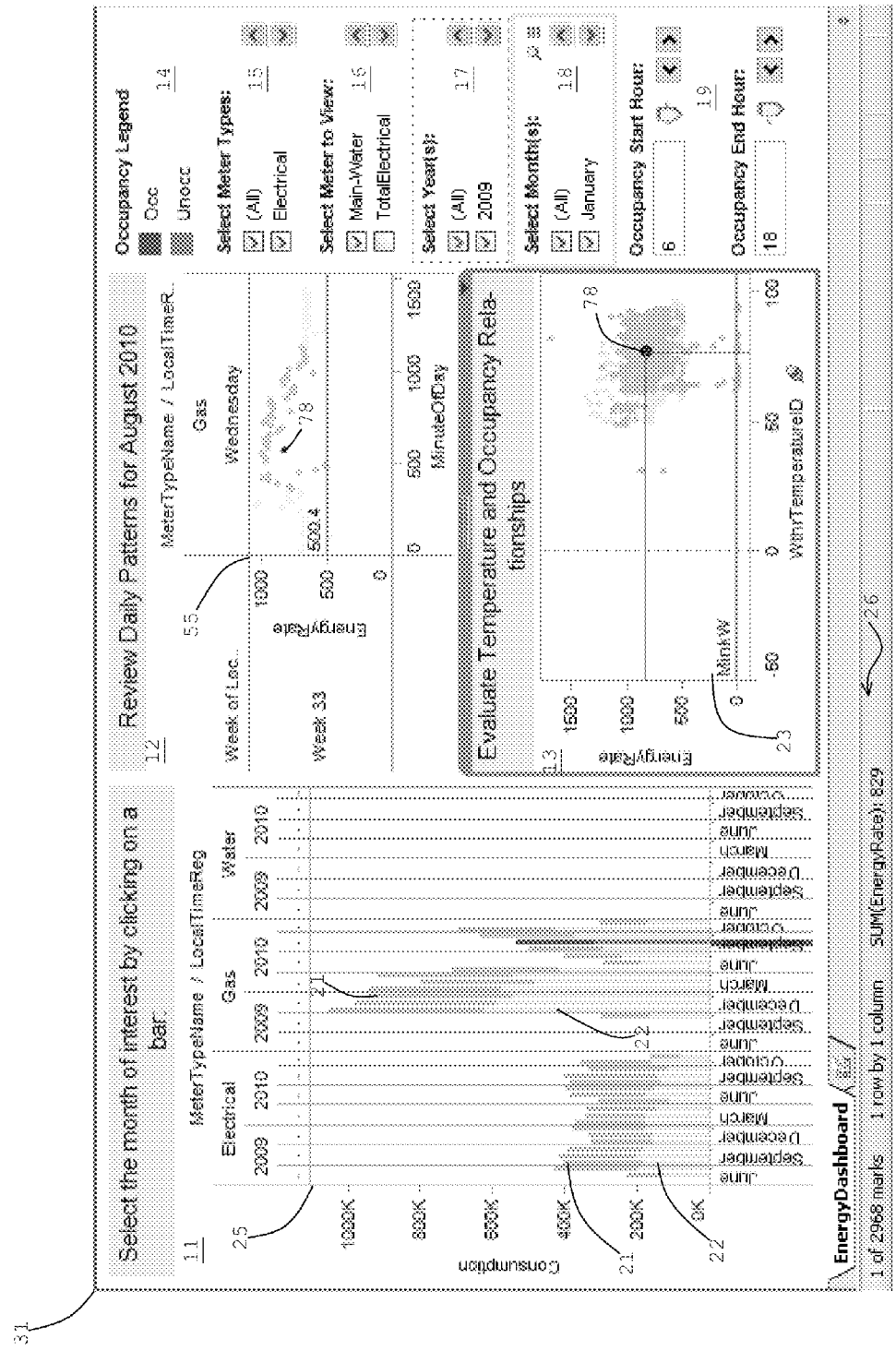
FIG. 22 is a diagram of the scatter plot with a selected data point having lines from the point to respective axes for a reading of an energy rate and Wthr temperature ID, respectively.

In graph 55 of pane 12 in FIG. 21, a data point 78 may be selected with the cursor and lines may be dropped from data point 78 to the axis of the graph 55 so that the energy rate can be accurately determined graphically on the other axis and that the minute of the day can likewise be determined graphically. Similarly in FIG. 22, lines may be dropped from the selected point 78 in graph 23 of pane 13 so that the energy rate and outside air temperature may accurately be determined from the axes of the graph. However, tool tips 53 and 58 (FIGS. 10 and 11) may similarly be obtained for the data point in graphs 55 and 23, respectively, in FIGS. 21 and 22.

Figure 23:
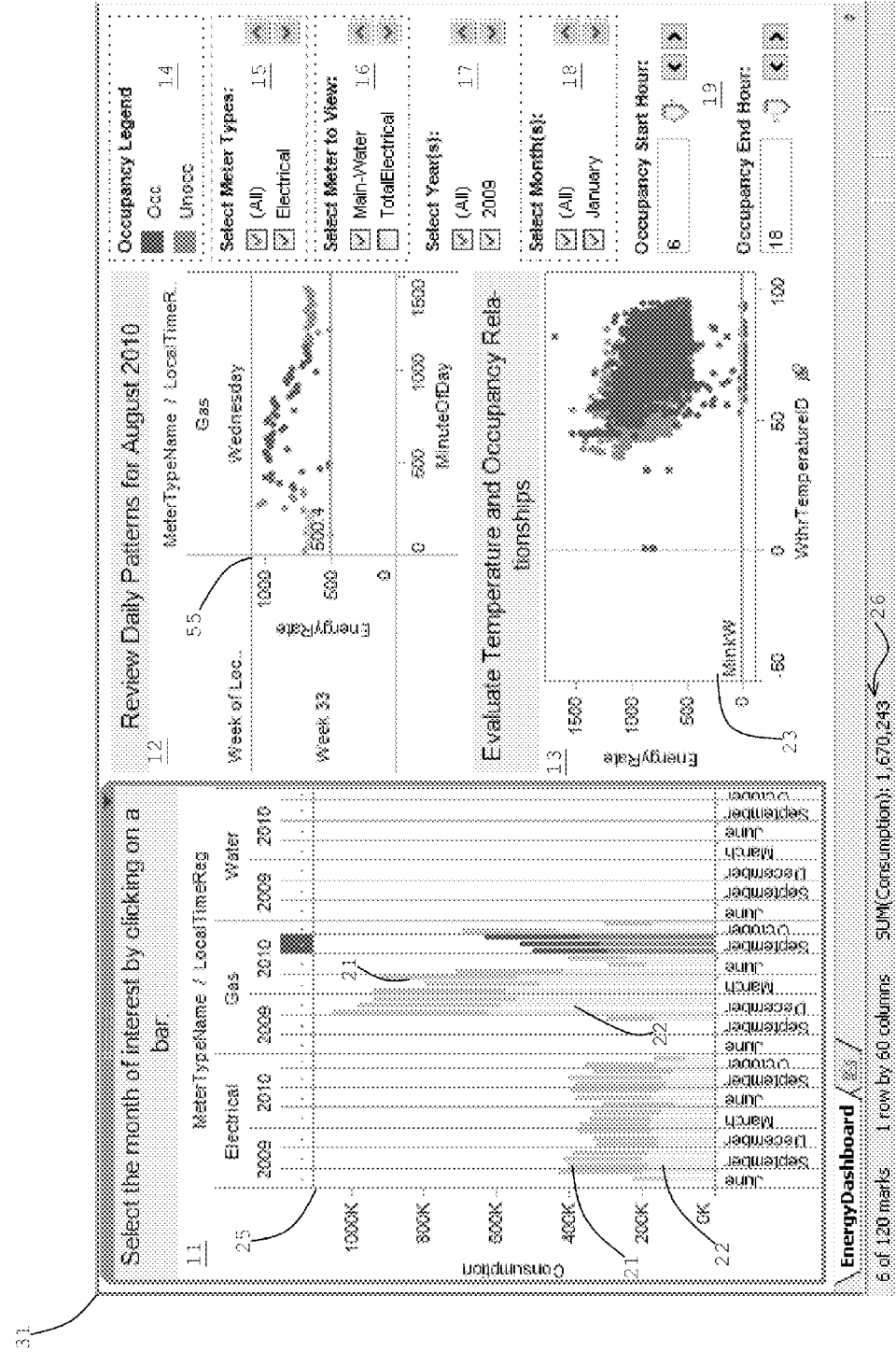
FIG. 23 is a diagram of the dashboard with a selection of three months of energy use data for gas which are shown in the scatter plot.
Figure 24:
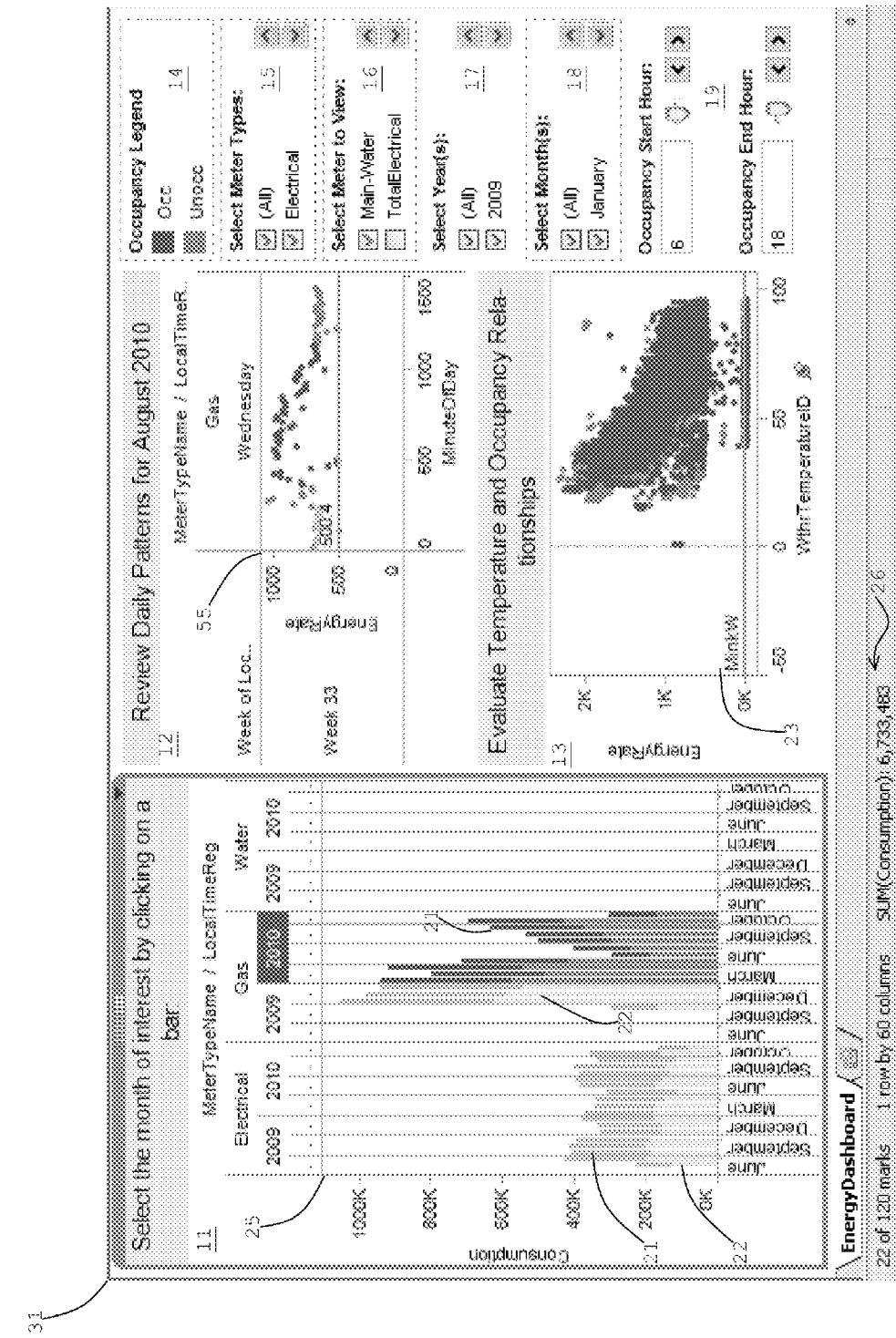
FIG. 24 is a diagram of the dashboard with a selection of a year of energy use data for gas which is shown in the scatter plot.

Consumption or demand of gas or other utility may be looked at in terms of consumption or demand for a quarter or a year as shown by FIGS. 23 and 24, respectively, in graph 25 for selected meters. All the data points for the longer periods of time may be present in graph 23. The consumption totals of 1,670,243 and 6,733,483 units for the quarter and the year, respectively, may be noted at item 26. The consumption may also be noted for gas or electrical as a total for all of the time that data is available. The consumption may further be noted in total for gas, electrical and water (all meter types) for all of the time that data is recorded as indicated in graph 25 of FIG. 25. The total consumption as indicated at item 26 appears to be 99,763,414 units. Combining consumption or demand from different types of utilities may require conversion to common units in the underlying data source.

Figure 25:
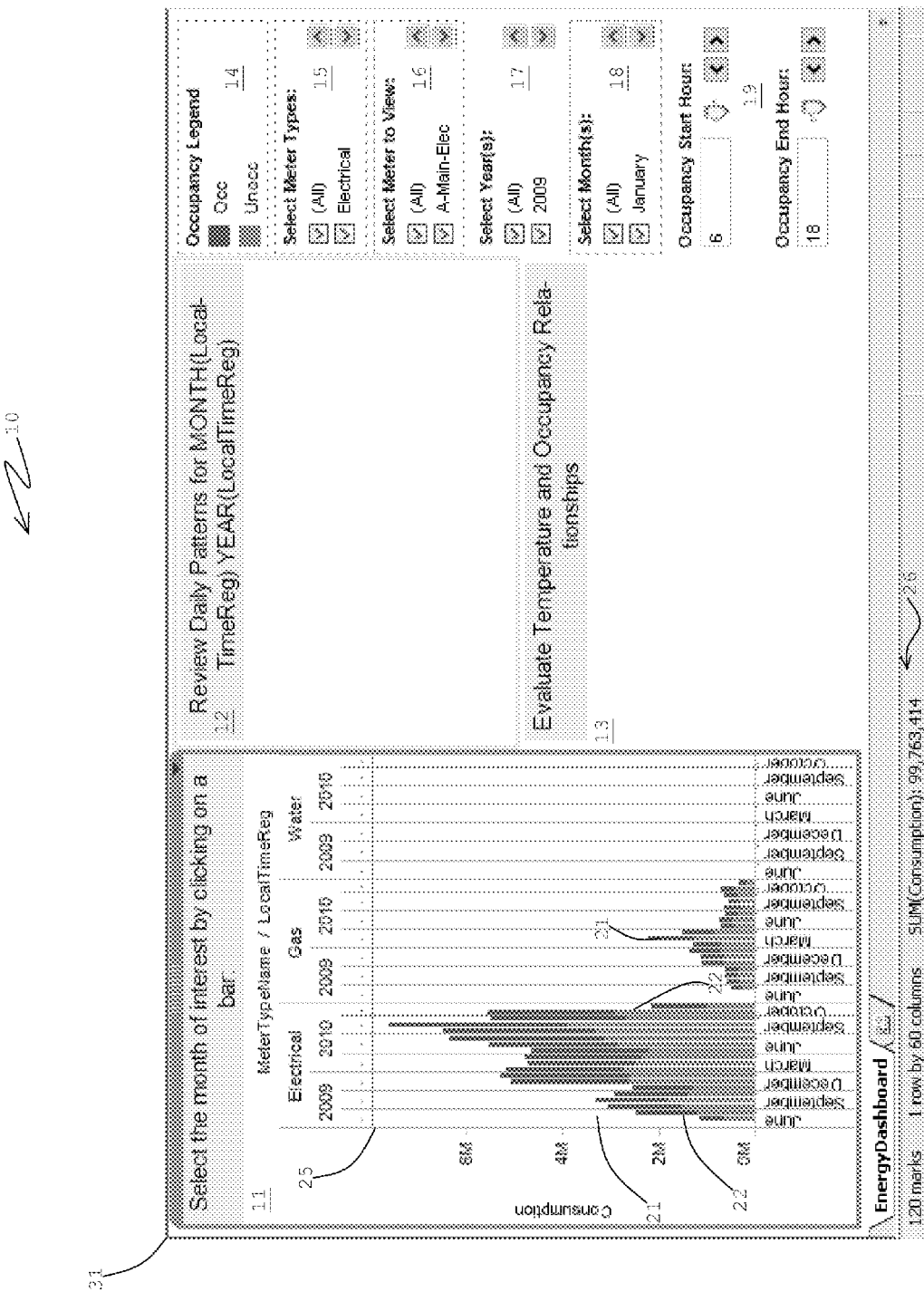
FIG. 25 is a diagram of a selection in the left pane of the dashboard for virtually all of the recorded time in terms of months and for all meter types in the system.
Figure 26:
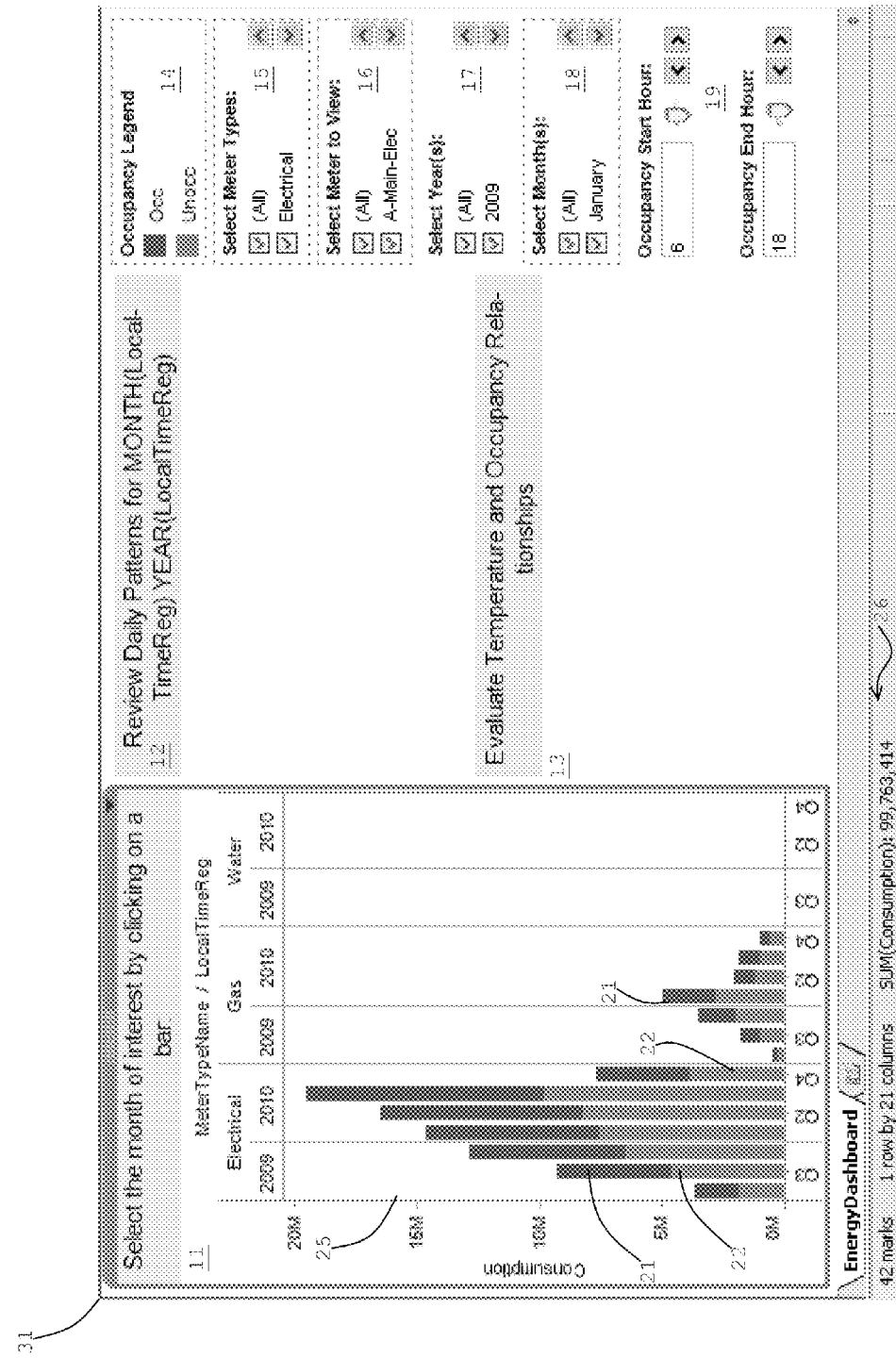
FIG. 26 is a diagram of a selection in the left pane of the dashboard for virtually all of the recorded time in terms of quarters and for all meter types in the system.
Figure 27:
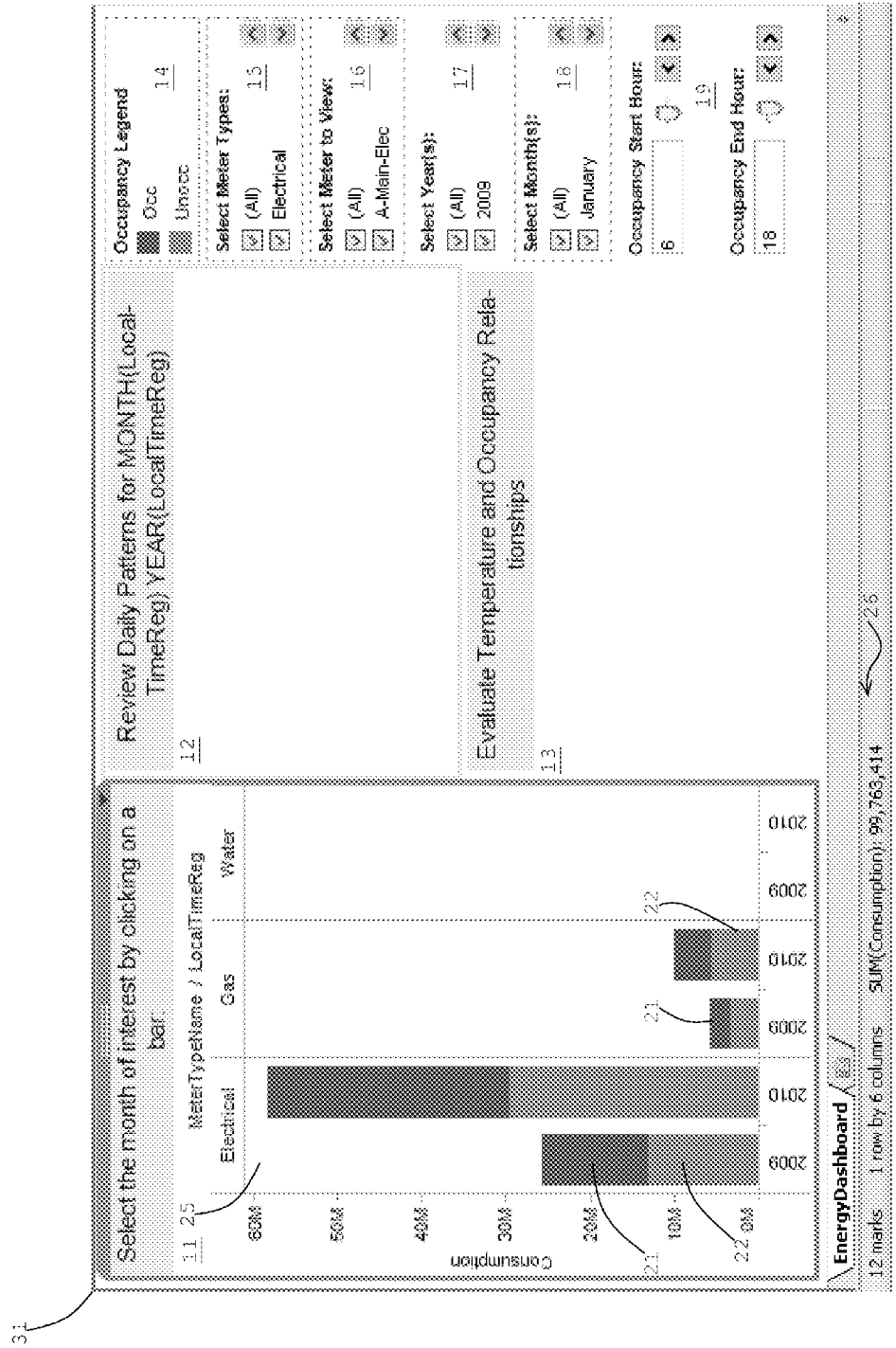
FIG. 27 is a diagram of a selection in the left pane of the dashboard for virtually all of the recorded time in terms of years and for all meter types in the system.

FIG. 25 shows in graph 25 the total in terms of months on which the cursor may be placed to obtain for a monthly total for occupied and unoccupied periods for each meter type. FIG. 26 shows in graph 25 the total in terms of quarters on which the cursor may be placed to obtain a quarterly total for occupied and unoccupied periods for each meter type. FIG. 27 shows in graph 25 the total in terms of years on which the cursor may be placed to obtain a yearly total for occupied and unoccupied periods for each meter type.

Figure 28:
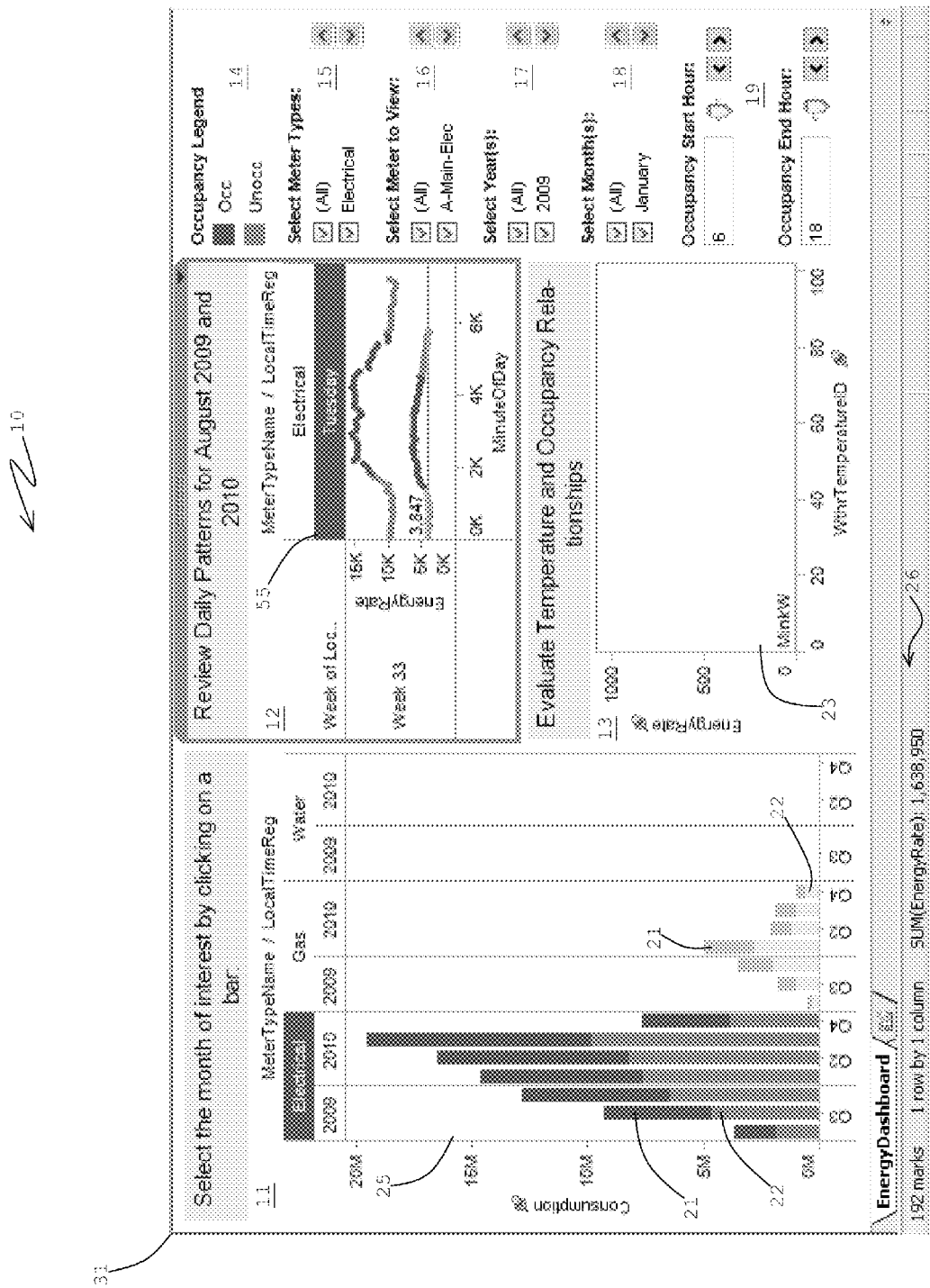
FIG. 28 is a diagram of a calendar pane of the dashboard which reveals a year over another year comparison of electrical energy use for a certain day.
Figure 29:
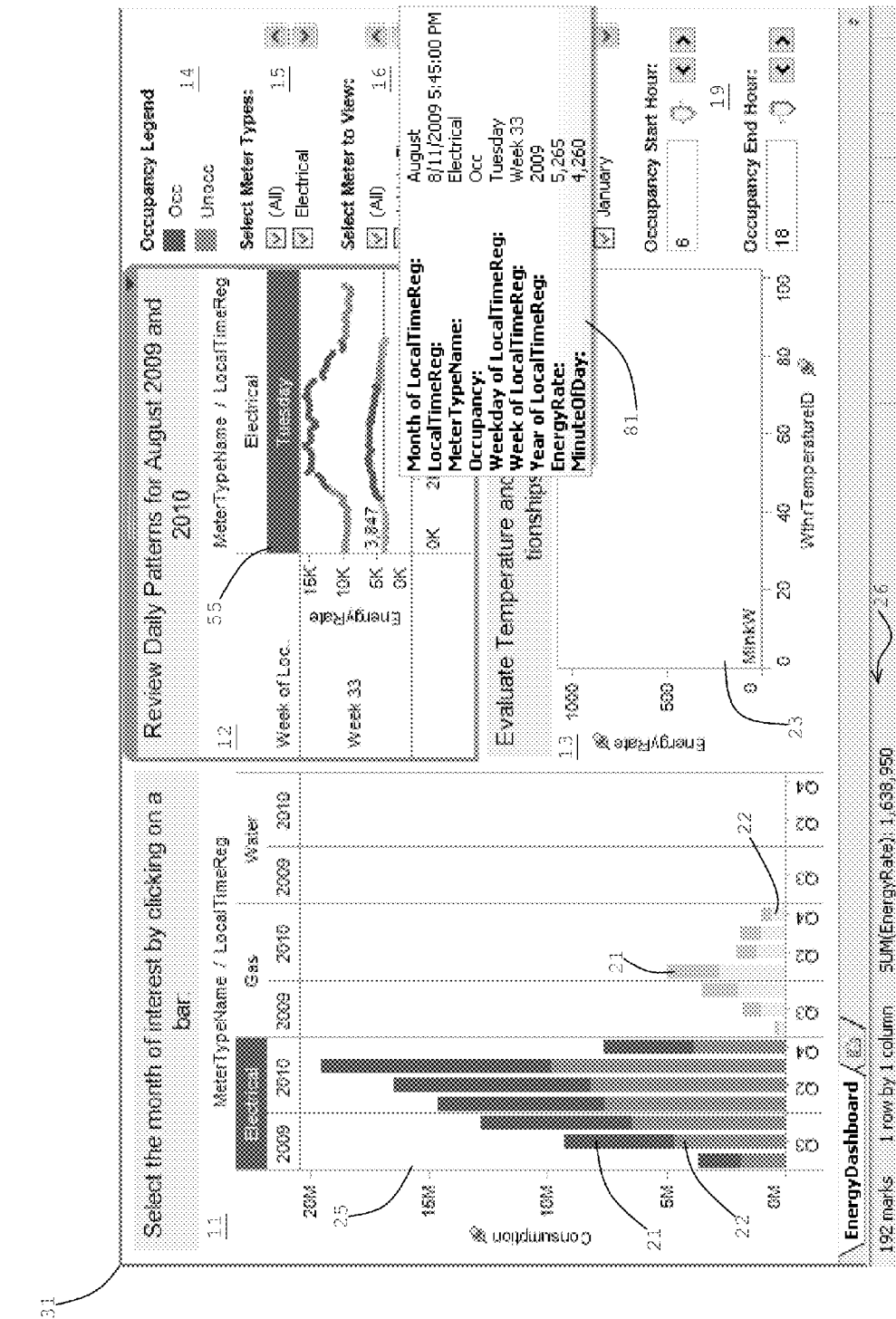
FIG. 29 reveals a tool tip for the certain day of the first year noted in FIG. 28.
Figure 30:
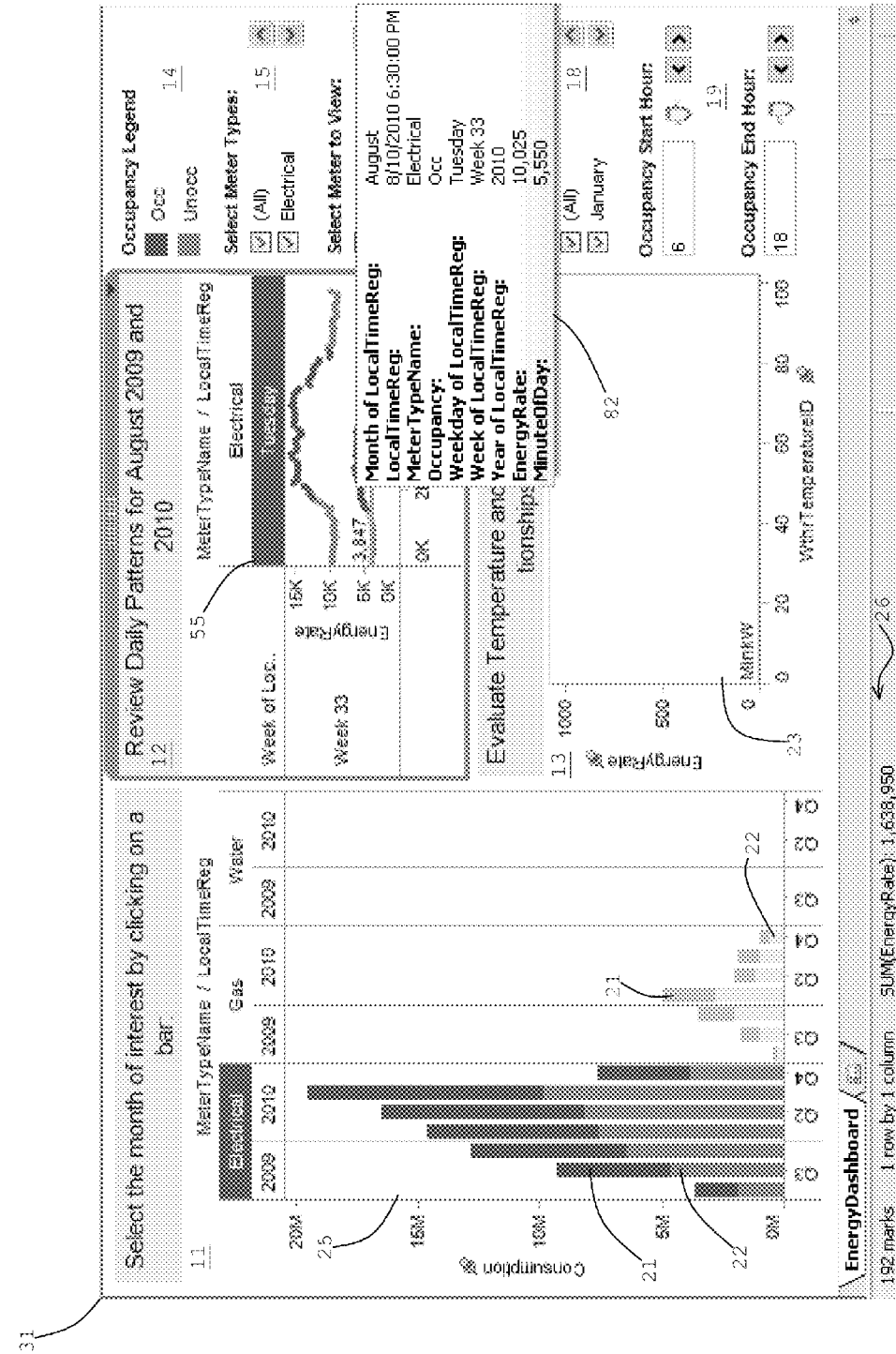
FIG. 30 reveals a tool tip for that day in the other year in FIG. 28.

Pane 12 in FIG. 28 reveals a year 2009 over another year 2010 comparison of electrical consumption for a certain day (e.g., a Tuesday in August) in graph 55. FIG. 29 reveals a tool tip 81 for that day in year 2009 and FIG. 30 reveals a tool tip 82 for that day in year 2010.

Figure 31:
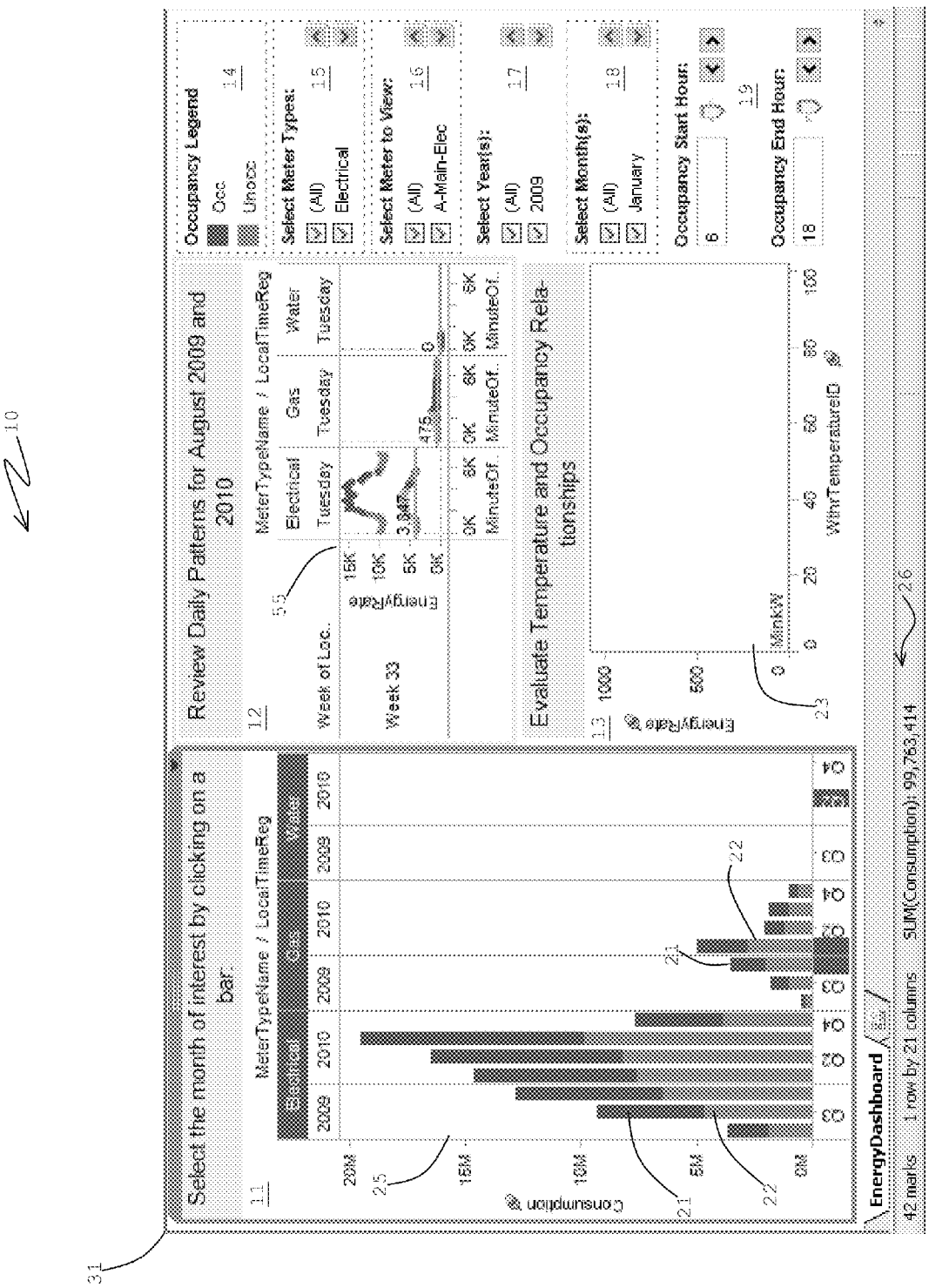
FIG. 31 not only reveals daily energy use for a year over year comparison for a particular day, but it also reveals such comparison for three different meter types.

FIG. 31 not only reveals in graph 55 consumption for a year over year (e.g., 2010 over 2009) comparison, but it reveals such comparison for three different meters, e.g., electrical, gas and water.

Figure 32:
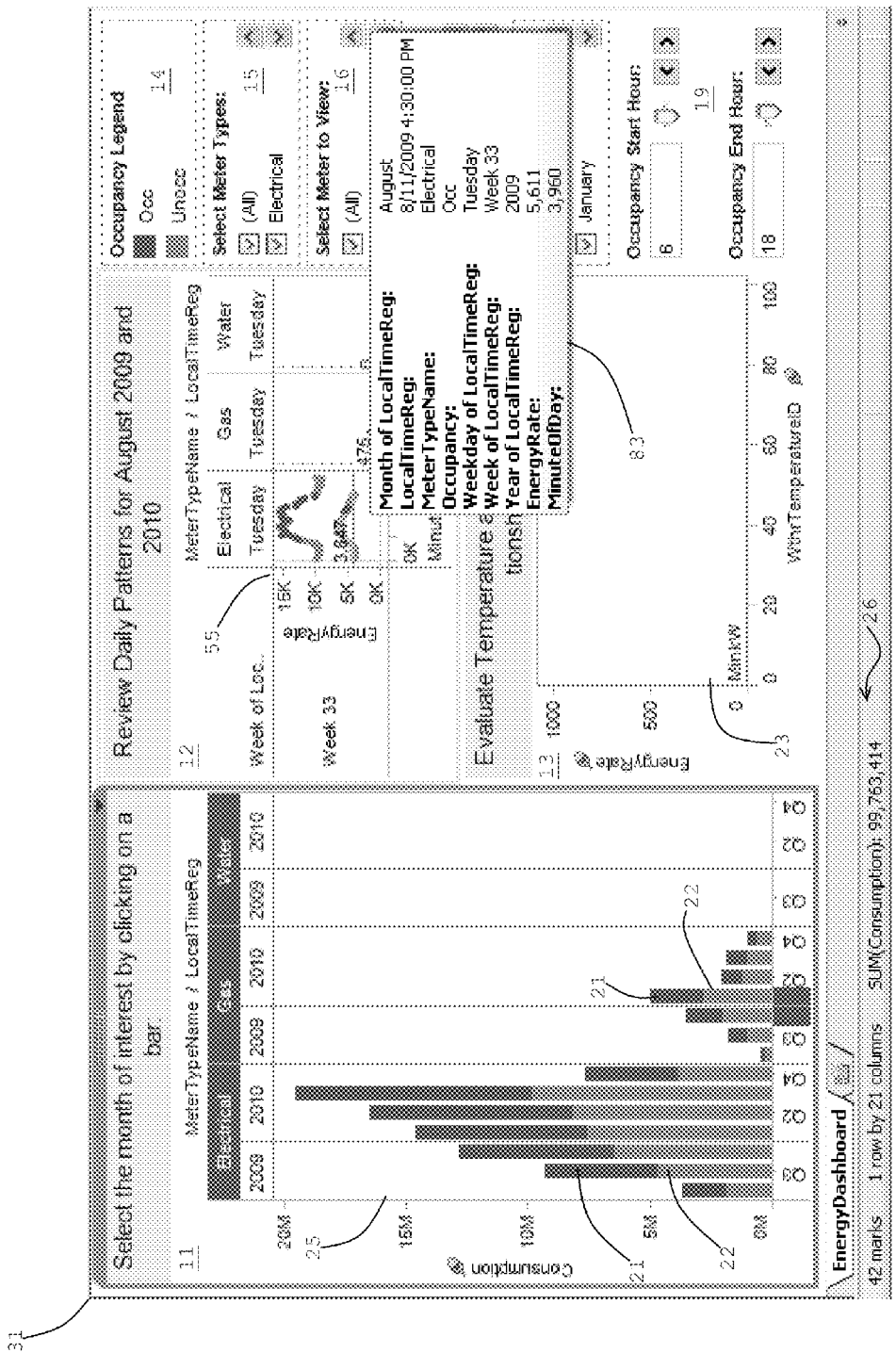
FIGS. 32 and 33 show a tool tip for electrical data point on a particular day in one year, and a tool tip for electrical data point on the same particular day of another year, respectively, for a multiple year comparison.
Figure 33:
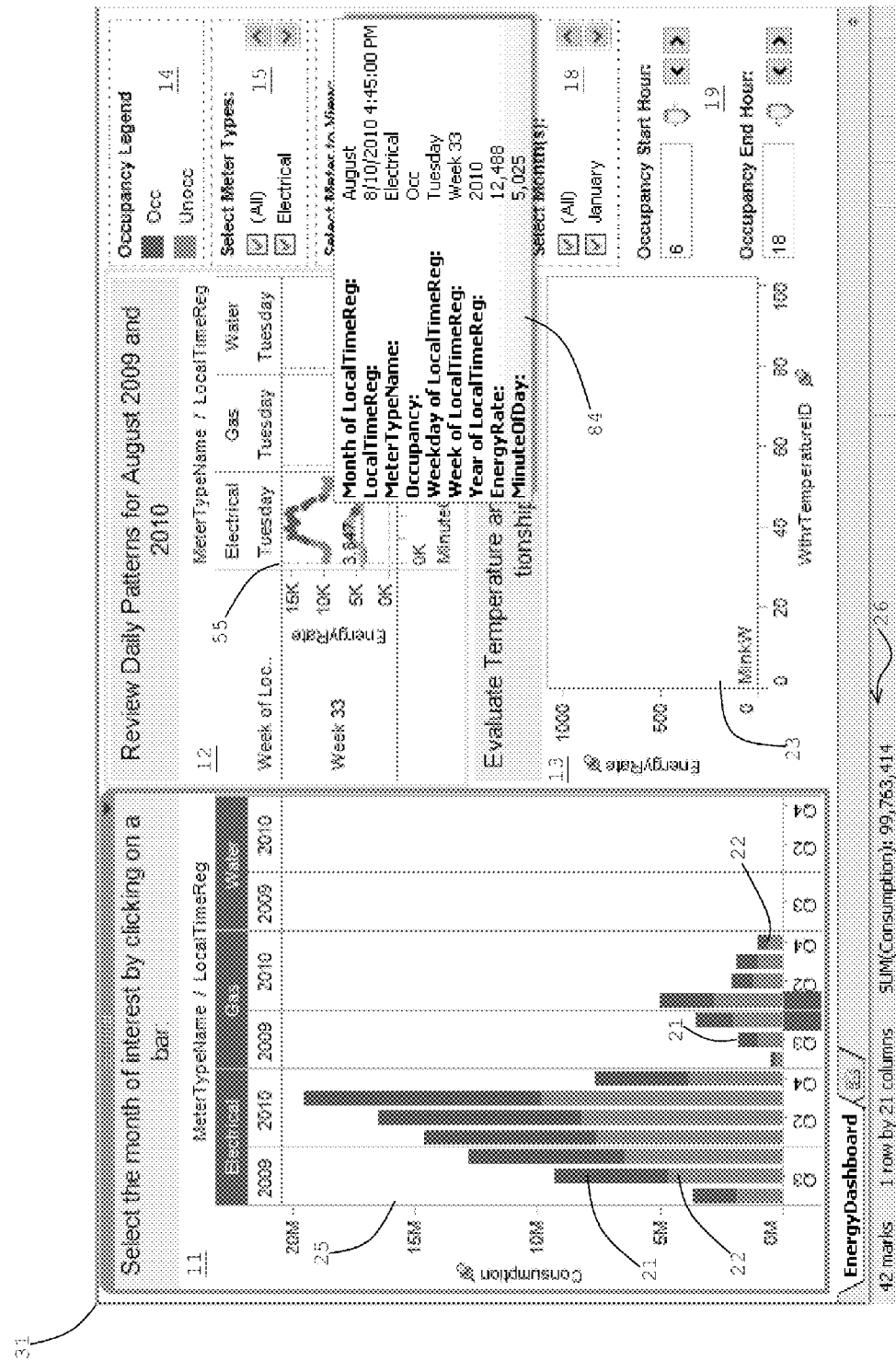
Figure 34:
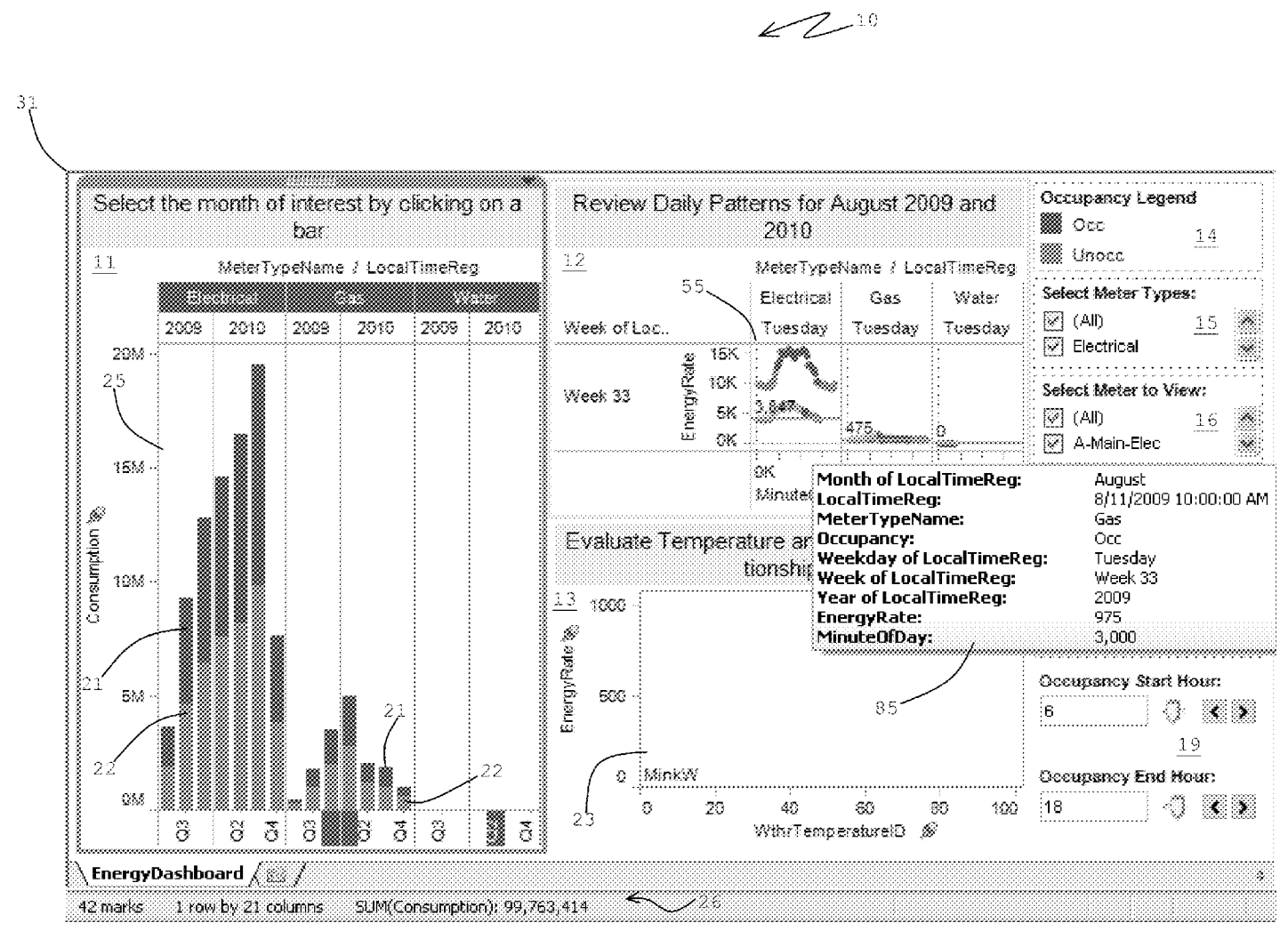
Figure 35:
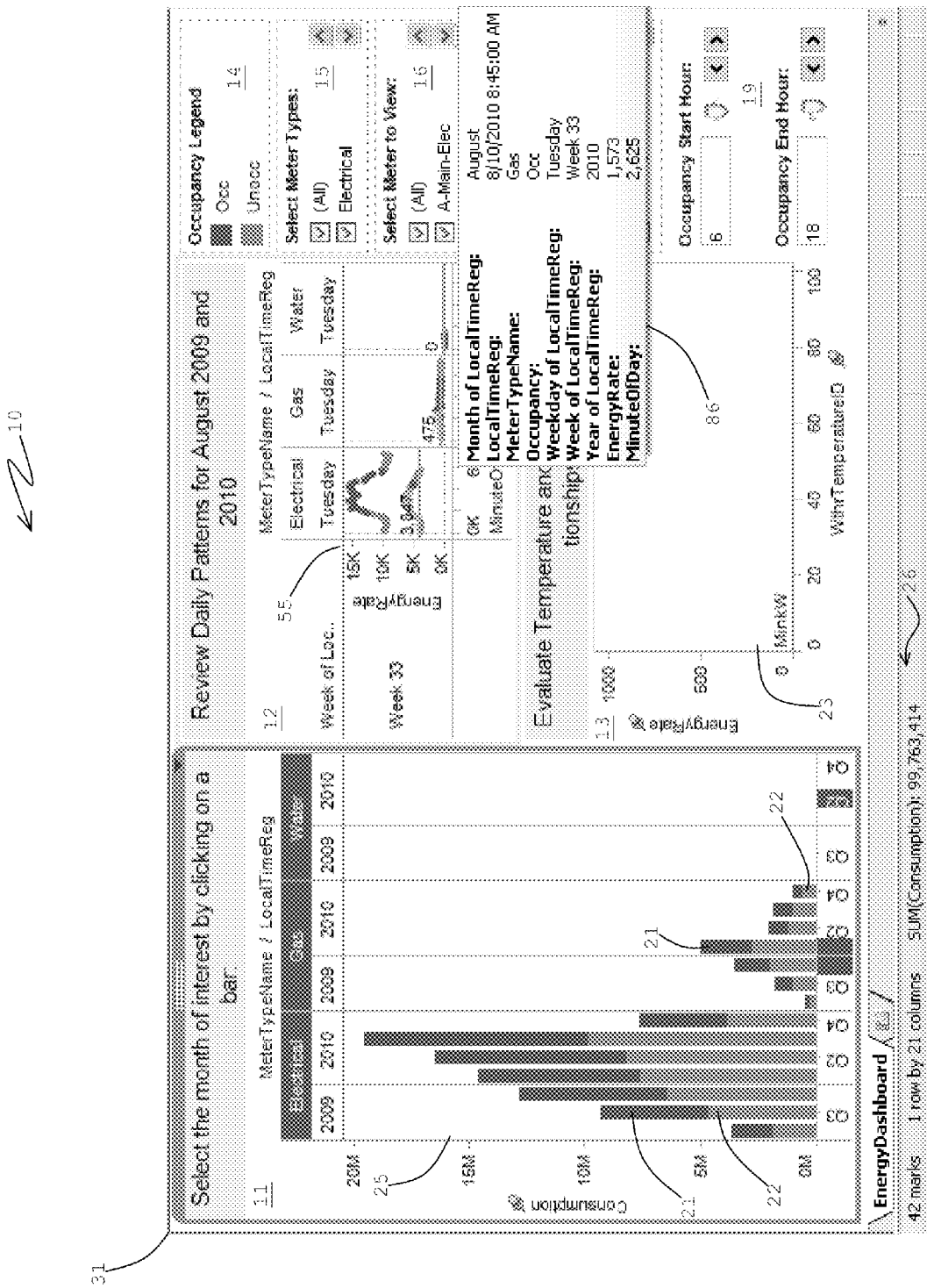

FIGS. 32 and 33 show a tool tip 83 for electrical data point on Tuesday, week 33, of year 2009, and a tool tip 84 for electrical data point on Tuesday, week 33, of year 2010, respectively. FIGS. 34 and 35 show a tool tip 85 for a gas data point on Tuesday, week 33 of year 2009, and a tool tip 86 for a gas data point on Tuesday, week 33 of year 2010, respectively.

Figure 36:
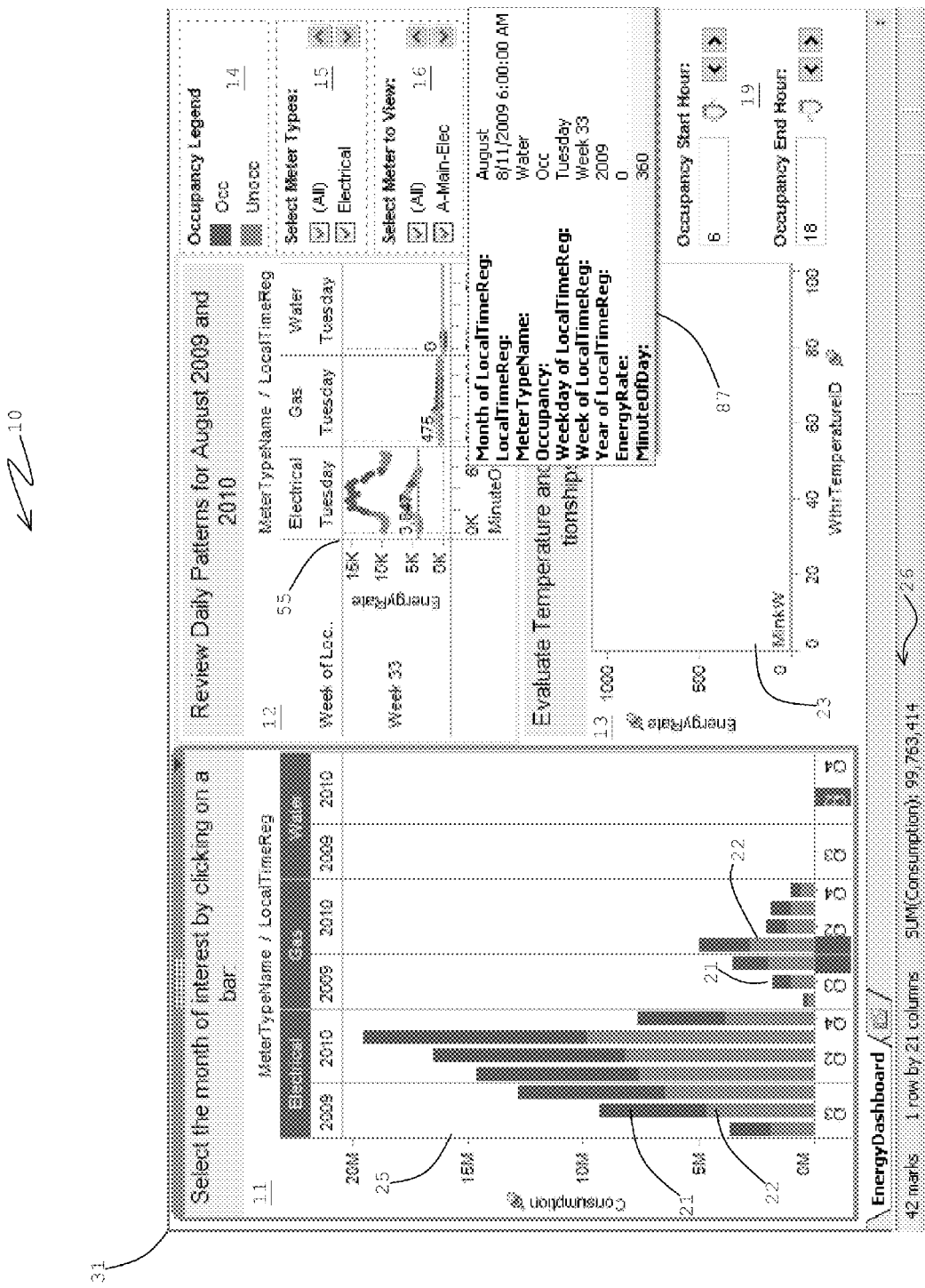
FIG. 36 is a diagram of a tool tip for water on particular day of a particular day in a certain year.

FIG. 36 shows a tool tip 87 for a water data point on Tuesday, week 33 of 2009. Water consumption appears as zero for 2009, and water consumption for the same day in 2010 would also be shown to be zero for this data set.

More years of consumption may be shown with dashboard 10. Also, data for more types of meters may be shown on dashboard 10.

A recap in view of FIGS. 1-36 may be provided. A system, having a utility consumption dashboard, may incorporate a processor, a user interface connected to the processor, and a display connected to the processor. The display may show a dashboard. The dashboard may have one or more of panes. At least one pane may have an integrated and interactive view of information related to energy.

A first pane of the one or more panes may have a graph indicating utility consumption of a space versus time. A second pane may have a calendar view of the utility consumption versus time. A third pane may have a scatter plot of utility consumption versus a context variable. The context variable may be air temperature outside the space, sales volume, production rates, space population density and/or another context variable that impacts utility consumption. The scatter plot may be derived at least in part from the utility consumption versus time. There may be additional panes.

The graph indicating utility consumption of a space versus time may reveal utility consumption according to context. The context may provide a status of a space of utility consumption. The status of a space may incorporate a context variable. The context variable may involve occupied, unoccupied, sales volume, production rates, space population density and/or another context variable that impacts utility consumption.

The graph may also indicate utility consumption according to type. Type may be electrical, gas, water, and/or other type of utility consumption. Each of the one or more panes may reveal a presentation of other utility consumption related information. Information related to energy may include energy consumption.

The second pane may zoom to a graph of data points for a single day of utility consumption. The data points for the single day of utility consumption may be shown in a scatter plot of the third pane. The second pane may zoom to graphs of data points for two or more single days distinguished from one another according to type of utility consumption and/or according to time.

An approach for presenting a utility consumption dashboard may incorporate generating a dashboard on a display with a processor, generating one or more panes on the dashboard, and at least one pane having an interactive view of information related to energy. Interaction with the interactive view of the information related to energy may be effected with a user interface.

A first pane of the one or more panes on the dashboard may have a graph of utility consumption versus a time period. A second pane may have a calendar view of utility consumption for a selected unit of the time period in the graph of the first pane.

The utility consumption of the graph of the first pane may be in a context. The context may incorporate occupied, unoccupied, sales volume, production rates, space population density in a space where the utility consumption is effected, and/or another context that impacts utility consumption.

A calendar view of a selected unit of the time period may be zoomed in to an incremental view of utility consumption within the selected unit of the time period. Utility consumption of the graph in the first pane may be of a type. Type may be electrical, gas, water and/or other types of utility consumption.

A third pane of the one or more panes may include a scatter plot of data points from utility consumption indicated in the calendar view of the second pane. The approach may further incorporate generating a tool tip on a data point of the data points. The tool tip may provide detailed information about the data point. Detailed information may involve context, selected unit of the time period, type and/or other properties about the data point. The context may be a variable that impacts utility consumption. The variable may be incorporate air temperature outside the space, sales volume, production rates and/or space population density. There may be additional panes.

Another example of a utility consumption dashboard system may incorporate a display, a processor connected to the display, and a utility consumption dashboard generated on the display by the processor. The utility consumption dashboard may have one or more panes. A first pane of the one or more panes may have a view of utility consumption by a space versus date time period. A second pane may have a view of a plot of utility consumption versus a context variable for one or more increments of the date time period. The context variable may involve air temperature outside the space, sales volume, production rates, space population density and/or another context variable that impacts utility consumption. The utility consumption dashboard may also have a third pane. The third pane may have a calendar view of the utility consumption.

A selection of one or more data points in the view of the plot may drive the calendar view. The selection of the one or more data points in the view of the plot may result in a dynamic interaction among utility consumption, the date time period and a context variable. The context variable may be of the air temperature outside the space, sales volume, production rates, space population density and/or another context that impacts utility consumption. A selection of a particular data point in the plot may result in a tool tip providing details about the data point. The details may incorporate at least occupancy context, date time period, utility consumption and/or air temperature outside the space.

Related applications may incorporate U.S. patent application Ser. No. 12/483,433, filed Jun. 12, 2009, and entitled "Method and System for Providing an Integrated Building Summary Dashboard"; U.S. patent application Ser. No. 12/259,959, filed Oct. 28, 2008, and entitled "Apparatus and Method for Displaying Energy-Related Information", which claims the benefit of U.S. Provisional Patent Application No. 60/987,143, filed Nov. 12, 2007; and U.S. patent application Ser. No. 11/770,626, filed Jun. 28, 2007, and entitled "Thermostat with Usage History".

U.S. patent application Ser. No. 12/483,433, filed Jun. 12, 2009, is hereby incorporated by reference. U.S. patent application Ser. No. 12/259,959, filed Oct. 28, 2008, is hereby incorporated by reference. U.S. Provisional Patent Application No. 60/987,143, filed Nov. 12, 2007, is hereby incorporated by reference. U.S. patent application Ser. No. 11/770,626, filed Jun. 28, 2007, is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A utility consumption dashboard system comprising:
   a display;
   a processor connected to the display; and
   a utility consumption dashboard generated on the display by the processor; and
   wherein:
   the utility consumption dashboard comprises one or more panes;
   a first pane of the one or more panes comprises a view of utility consumption by a space versus date time period; and
   a second pane of the one or more panes comprises a view of a plot of utility consumption versus a context variable over one or more increments of the date time period, where the one or more increments of the date time period are selected in the first pane;
   a third pane of the one or more panes, wherein the third pane comprises a calendar view of the utility consumption over the one or more increments of the date time period selected in the first pane and a selection of one or more data points in the view of the plot drives the calendar view;
   the first pane, the second pane, and the third pane are displayed simultaneously on the utility consumption dashboard;
   the context variable is selected from a group consisting of air temperature outside the space, sales volume, production rates, space population density and another context variable that impacts utility consumption.

2. The system of claim 1, wherein:
   the selection of the one or more data points in the view of the plot results in a dynamic interaction among utility consumption, the date time period and the context variable.

3. The system of claim 1, wherein:
   a selection of a data point in the plot results in a tool tip providing details about the data point;
   the details comprise at least one or more of occupancy context, date time period, utility consumption and the context variable.

4. A system having a utility consumption dashboard, comprising:
   a processor;
   a user interface connected to the processor; and
   a display connected to the processor; and
   wherein:
   the display comprises a presentation of a dashboard;
   the dashboard comprises two or more panes viewable simultaneously;
   a first pane of the two or more panes comprises a graph indicating utility consumption of a space versus time;

a second pane of the two or more panes comprises a calendar view of the utility consumption versus time over a time period selected in the graph of the first pane;

a third pane of the two or more panes comprises a scatter plot of utility consumption versus a context variable and a selection of one or more data points from the scatter plot drives the calendar view;

the first pane, the second pane and the third pane of the two or more panes are displayed simultaneously on the dashboard; and at least one pane comprises an integrated and interactive view of information related to energy.

5. The system of claim 4, wherein:
the context variable is selected from a group consisting of air temperature outside the space, sales volume, production rates, space population density and another context variable that impacts utility consumption; and
the scatter plot is derived at least in part from the utility consumption versus time.

6. The system of claim 4, wherein:
the graph indicating utility consumption of a space versus time reveals utility consumption according to context;
the context comprises a status of a space of utility consumption; and
the status of a space comprises a context variable;
the context variable is selected from group consisting of occupied, unoccupied, sales volume, production rates, space population density or another context variable that impacts utility consumption.

7. The system of claim 4, wherein:
the graph indicates utility consumption according to type; and
type comprises one or more of electrical, gas, water, and other type of utility consumption.

8. The system of claim 4, wherein information related to energy comprises energy consumption.

9. The system of claim 4, wherein the second pane zooms to a graph of data points for a single day of utility consumption.

10. The system of claim 9, wherein the data points for the single day of utility consumption are shown in the scatter plot of the third pane.

11. The system of claim 4, wherein the second pane zooms to graphs of data points for two or more single days distinguished from one another according to one or more of type of utility consumption and time.

12. The system of claim 4, wherein the calendar view comprises days of the week in columns and weeks in rows.

13. The system of claim 12, wherein:
the columns intersect with the rows and at each intersection of a column with a row is a calendar day; and
in each calendar day, a minimum utility consumption for that day is displayed.

14. A method for presenting a utility consumption dashboard comprising:

generating a dashboard on a display with a processor;
generating one or more panes on the dashboard; and
wherein generating one or more panes on the dashboard includes generating:
a first pane of the one or more panes on the dashboard where the first pane comprises a graph of utility consumption versus a time period;
a second pane of the one or more panes where the second pane comprises a calendar view of utility consumption for a unit of the time period selected in the graph of the first pane;
a third pane of the one or more panes comprises a scatter plot of data points from utility consumption versus a context variable and a selection of one or more data points from the scatter plot drives the calendar view; and
the first pane, the second pane, and the third pane of the one or more panes are displayed on the dashboard simultaneously;
wherein at least one pane of the one or more panes comprises an interactive view of information related to energy.

15. The method of claim 14, wherein:
interaction with the interactive view of the information related to energy is effected with a user interface.

16. The method of claim 14, wherein:
the utility consumption of the graph of the first pane is in a context;
the context is selected from a group consisting of occupied, unoccupied, sales volume, production rates, space population density in a space where the utility consumption is effected, and another context that impacts utility consumption; and
a calendar view of a selected unit of the time period is zoomed to an incremental view of utility consumption within the selected unit of the time period.

17. The method of claim 14, wherein:
utility consumption of the graph in the first pane comprises a type; and
the type comprises one or more of electrical, gas, water and other types of utility consumption.

18. The method of claim 14, further comprising:
generating a tool tip on a data point of the data points; and wherein:
the tool tip provides detailed information about the data point;
detailed information comprises one or more of context, selected unit of the time period, type and other properties about the data point;
the context variable is a variable that impacts utility consumption; and
the variable may be selected from a group consisting of air temperature outside the space, sales volume, production rates and space population density.

* * * * *